(12) United States Patent
Nemoto et al.

(10) Patent No.: US 7,330,644 B1
(45) Date of Patent: Feb. 12, 2008

(54) RECORDING DEVICE

(75) Inventors: Takayuki Nemoto, Tokyo (JP);
 Kuniyoshi Suzaki, Tokyo (JP);
 Masanori Uchidoi, Kanagawa-ken (JP);
 Akihiko Suzuki, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/077,704

(22) Filed: Jun. 15, 1993

Related U.S. Application Data

(60) Continuation of application No. 07/766,824, filed on Sep. 26, 1991, now abandoned, which is a division of application No. 07/758,464, filed on Sep. 6, 1991, now Pat. No. 5,166,840, which is a continuation of application No. 07/630,375, filed on Dec. 18, 1990, now abandoned, which is a continuation of application No. 07/512,531, filed on Apr. 18, 1990, now abandoned, which is a continuation of application No. 07/187,219, filed on Apr. 28, 1988, now abandoned, which is a continuation of application No. 06/731,157, filed on May 6, 1985, now Pat. No. 4,783,707, which is a continuation of application No. 06/331,795, filed on Dec. 17, 1981, now abandoned, which is a continuation of application No. 06/030,930, filed on Apr. 17, 1979, now abandoned.

(30) Foreign Application Priority Data

| Apr. 23, 1978 | (JP) | .................................... 53-48012 |
| Apr. 23, 1978 | (JP) | .................................... 53-48013 |
| Apr. 23, 1978 | (JP) | .................................... 53-48014 |

(51) Int. Cl.
 *H04N 5/225* (2006.01)
(52) U.S. Cl. ..................... 386/117; 386/118; 386/120; 348/220.1; 348/207.99; 358/906; 358/909.1

(58) Field of Classification Search .................... 386/4, 386/38, 52, 55, 117–120; 348/207.99, 220.1, 348/221.1, 273–276; 358/906, 909.1; 360/13, 360/92; 369/83; *H04N 5/76, 5/225*
 See application file for complete search history.

(56) References Cited

U.S. PATENT DOCUMENTS 3,509,273 A * 4/1970 Kihara ...................... 360/35.1

(Continued)

FOREIGN PATENT DOCUMENTS

JP 503228 1/1975

(Continued)

*Primary Examiner*—Vincent F Boccio
(74) *Attorney, Agent, or Firm*—Abelman, Frayne & Schwab

(57) ABSTRACT

A camera apparatus includes a single release switch member. The single release switch member is for instructing an image capture operation, and selects one of a first operative state and a second operative state. The first operative state is selected when the single release switch member is pushed down to a first depth. The second operative state is selected when the single release switch member is pushed down to a second depth which is deeper than the first depth. The camera apparatus selects a recordable portion of a recording medium in response to selection of the first operative state, and generates a predetermined electrical signal if the camera apparatus selects the recordable portion of the recording medium. The camera apparatus records the image signal on the selected recordable portion if the second operative state is selected by the single release switch member, and the predetermined electrical signal is generated.

10 Claims, 12 Drawing Sheets

U.S. PATENT DOCUMENTS

| | | | | |
|---|---|---|---|---|
| 3,509,274 | A | * | 4/1970 | Kihara ........................ 360/10.1 |
| 3,653,669 | A | * | 4/1972 | Sterly ........................... 360/92 |
| 3,705,262 | A | * | 12/1972 | Kennedy et al. ............ 358/342 |
| 3,792,490 | A | * | 2/1974 | Wigal ........................... 360/62 |
| 3,833,758 | A | * | 9/1974 | Ferrari ........................ 386/117 |
| 3,925,815 | A | * | 12/1975 | Lemelson .................... 386/117 |
| 3,974,522 | A | * | 8/1976 | Fukatsu et al. ............. 358/906 |
| 4,040,098 | A | * | 8/1977 | Beeson et al. |
| 4,057,830 | A | * | 11/1977 | Adcock ....................... 358/906 |
| 4,097,893 | A | * | 6/1978 | Camras ....................... 358/906 |
| 4,131,919 | A | * | 12/1978 | Lloyd et al. ................. 358/906 |
| 4,139,874 | A | * | 2/1979 | Shiraishi ..................... 360/105 |
| 4,148,072 | A | * | 4/1979 | Vockenhuber .............. 348/346 |
| 4,160,587 | A | * | 7/1979 | Heiniger et al. ............ 396/117 |
| 4,163,256 | A | * | 7/1979 | Adcock ....................... 358/906 |
| 4,198,656 | A | * | 4/1980 | Mathisen .................... 386/117 |
| 4,262,301 | A | * | 4/1981 | Erlichman ................... 358/906 |
| 4,783,707 | A | * | 11/1988 | Nemoto et al. ............. 358/906 |

FOREIGN PATENT DOCUMENTS

| | | |
|---|---|---|
| JP | 5083923 | 7/1975 |
| JP | 50124607 | 9/1975 |
| JP | 50145018 | 11/1975 |
| JP | 5132218 | 3/1976 |
| JP | 5295408 | 7/1977 |

* cited by examiner

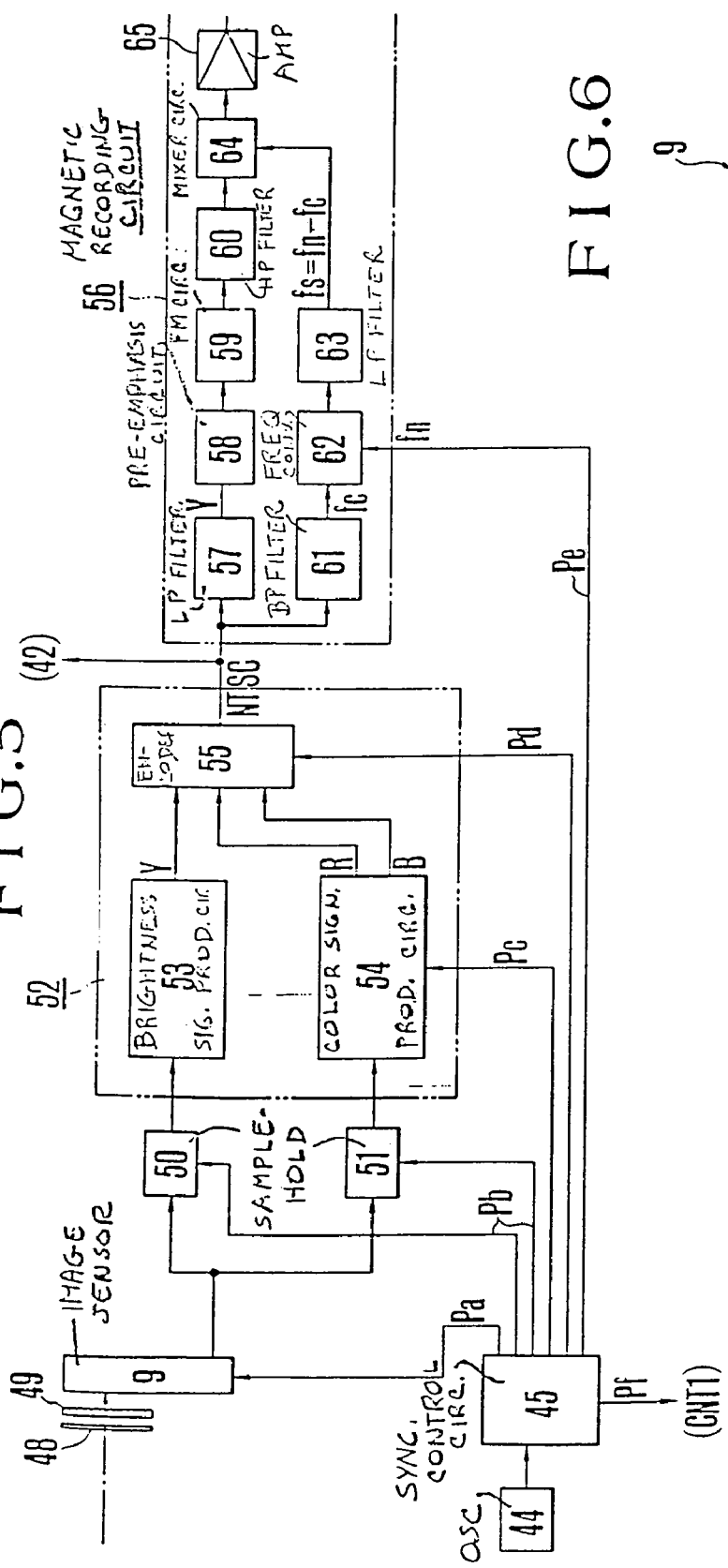
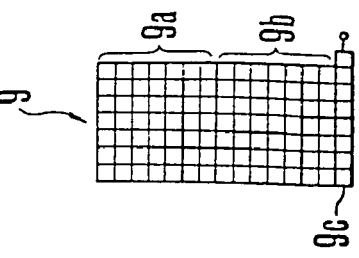
FIG. 5
FIG. 6

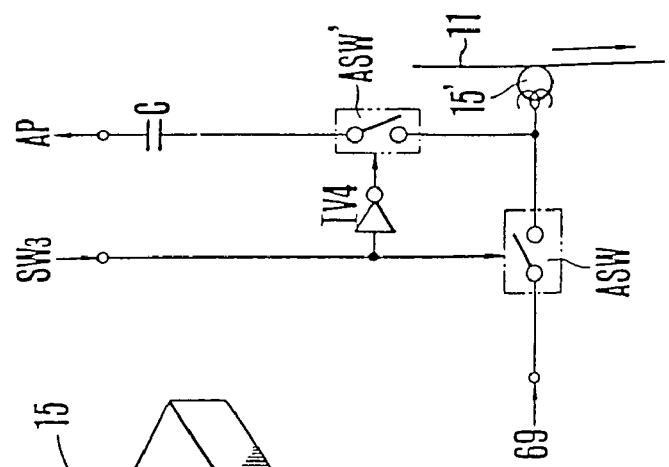
FIG. 14
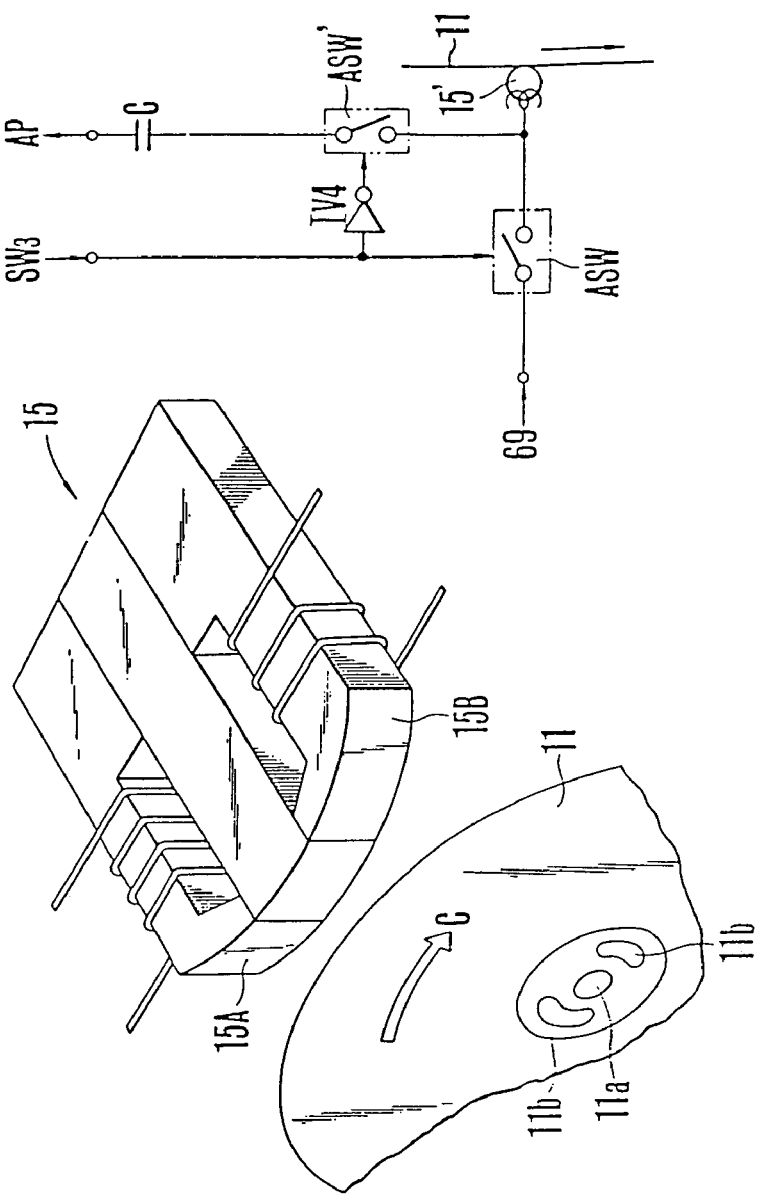
FIG. 8
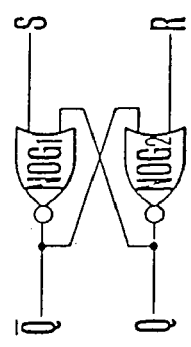
FIG. 7A
FIG. 7B

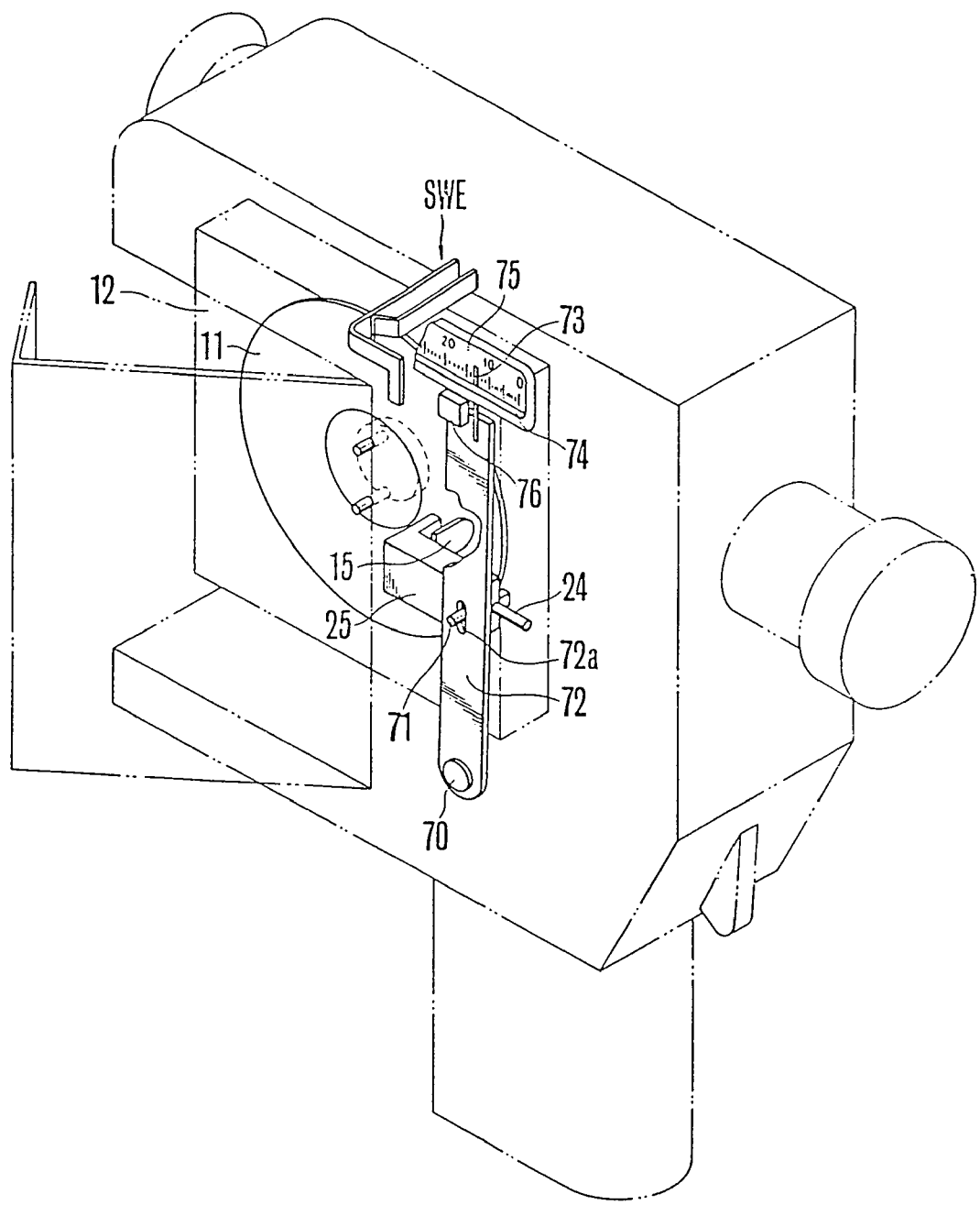

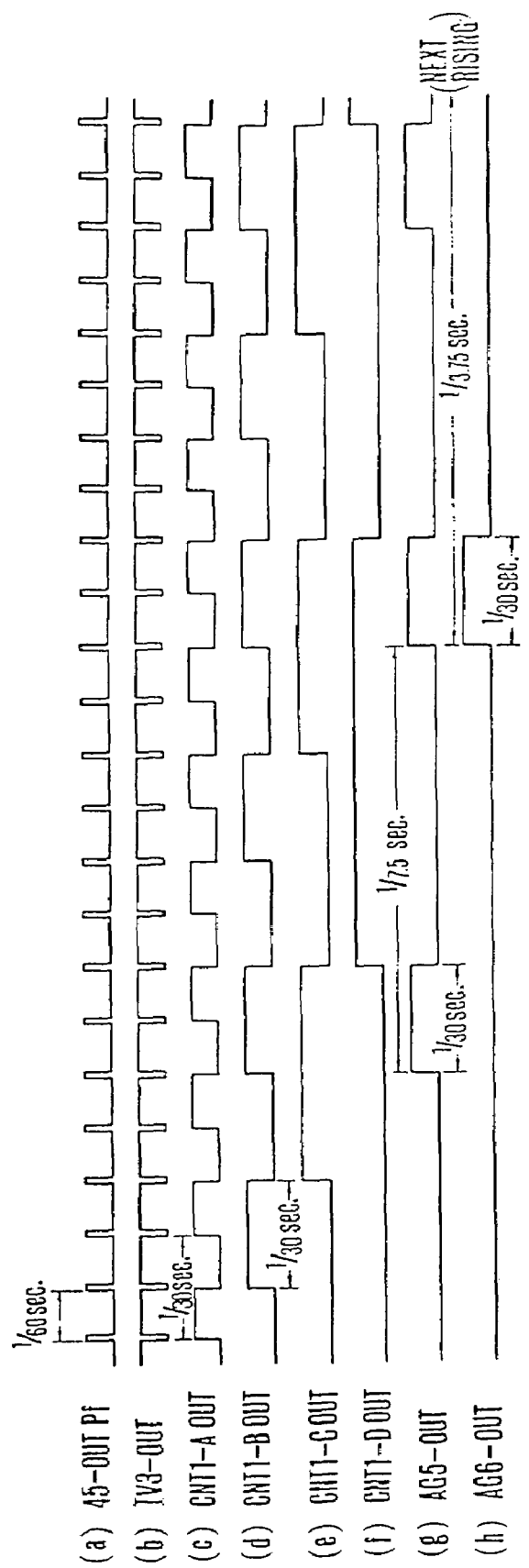

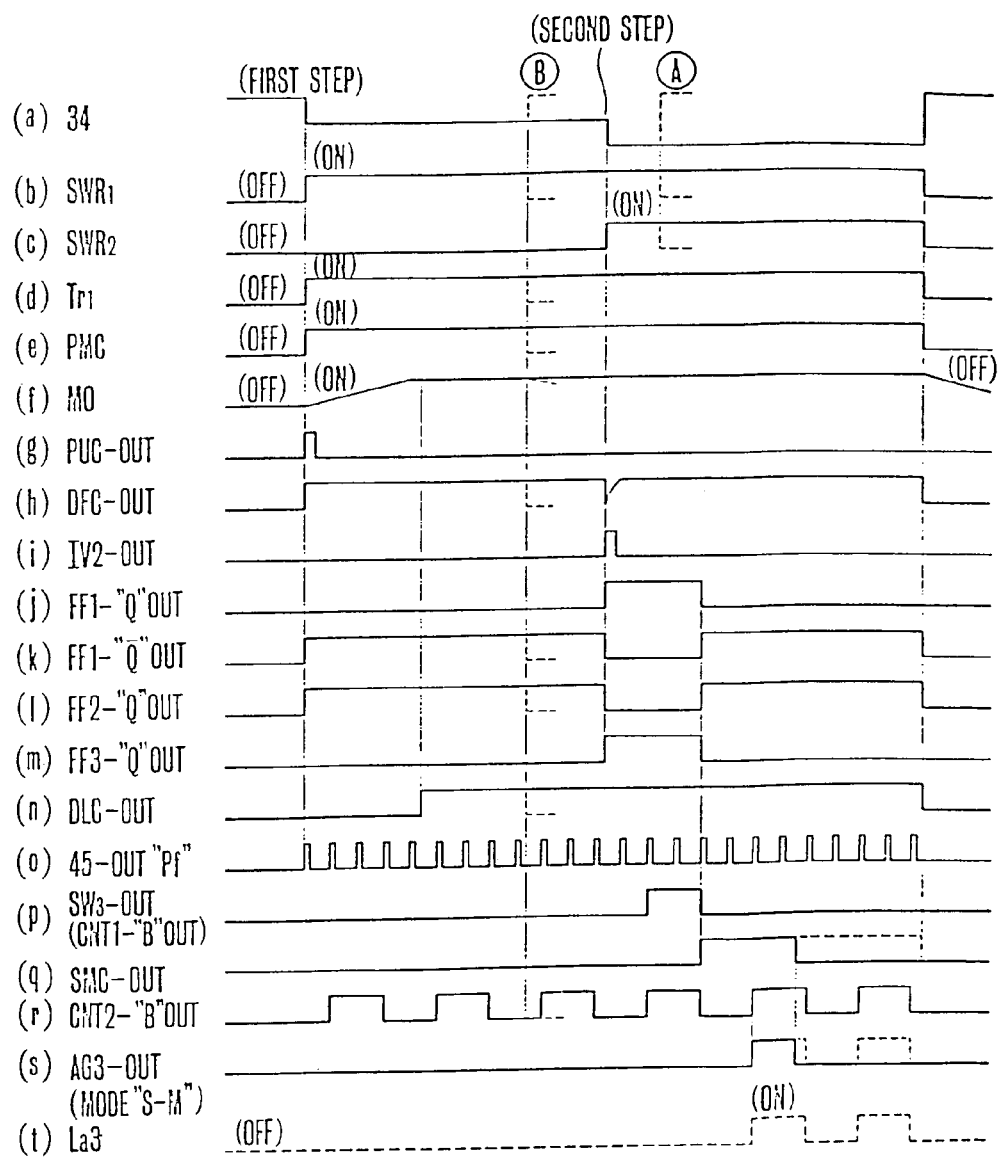

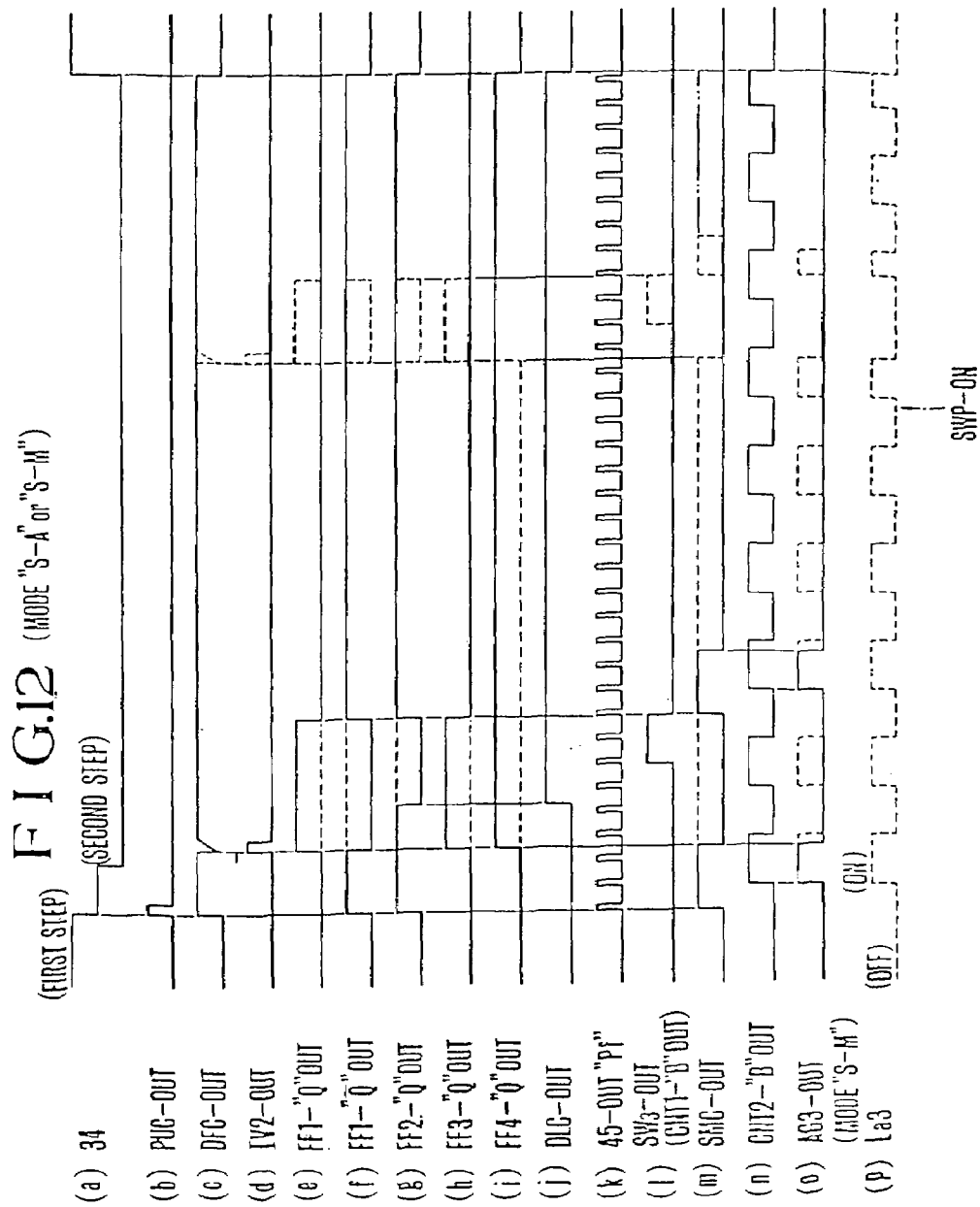

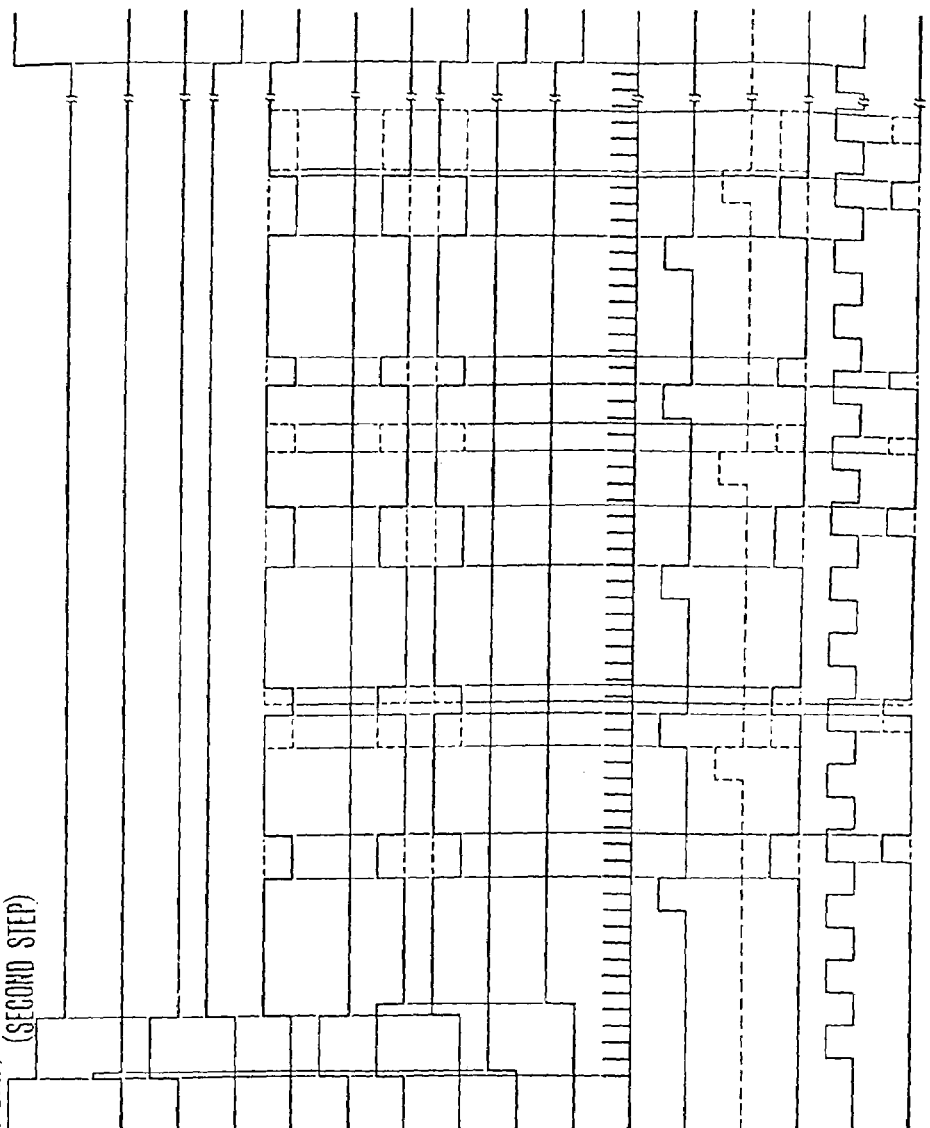

RECORDING DEVICE

This is a continuation of application Ser. No. 07/766,824, filed Sep. 26, 1991 now abandoned, which in turn is a divisional application of Ser. No. 07/758,464, filed Sep. 6, 1991 now U.S. Pat. No. 5,166,840; which in turn is a continuation application of Ser. No. 07/630,375, filed Dec. 18, 1990 now abandoned; which in turn is a continuation application of Ser. No. 07/512,531, filed Apr. 18, 1990 now abandoned; which in turn is a continuation application of Ser. No. 07/187,219, filed Apr. 28, 1988 now abandoned; which in turn is a continuation application of Ser. No. 06/731,157, filed May 6, 1985, which is now U.S. Pat. No. 4,783,707, issued Nov. 8, 1988; which in turn is a continuation application of Ser. No. 06/331,795, filed Dec. 17, 1981, now abandoned; which in turn is a continuation application of Ser. No. 06/030,930, filed Apr. 17, 1979 now abandoned.

BACKGROUND OF THE INVENTION

1. Field of the Invention

This invention relates to a picture image recording device and more particularly to a device using a recording medium which permits setting a plurality of recording tracks separately from each other for recording picture image signals on each of them.

2. Description of the Prior Art

Picture image recording devices of the type using a recording medium which permits setting a plurality of recording tracks separately from each other for recording signals of still picture images on each of the set tracks have already been proposed.

Since the recording device of this type is designed for recording still picture images, the basic function thereof is arranged, for example, to perform recording of one picture image each time a camera is triggered. Considering applications of the device of this type, if it is only possible to record more than just one picture image by each trigger operation, the function of the device is not always satisfactory and is thus applicable only to a limited range of purposes.

If the device of this type is arranged to be capable of continuously recording images on recording tracks as long as the camera trigger is persistently effected, it would be convenient for recording the images of a moving object such as recording for motion analysis or something like a so-called time-lapse filming. Such arrangement can be very advantageously usable, for example, for analyzing a golf swing, batting, a pitching motion and the like and, accordingly would find a wider range of applications by virtue or functional improvement.

On the other hand, the most advantageous point of the picture image recording device of this type lies in that, unlike a photographic camera that uses a silver salt film, it permits, for example: Even when recording has been made only halfway on the recording medium, the record can be taken out and put on a suitable reproducing device for appreciation of just the recorded part as desired; and, after appreciation, the recording medium can be returned to the recording device and then other picture images can be recorded on the rest of the recording medium. Or, with the fully recorded medium put on the reproducing device, some of the recorded tracks may be erased by means of an eraser and then other picture images may be recorded as replacement on the erased tracks.

For such usage, it is very important to provide some facility that permits accurate discernment of a recorded track and a track not recorded from each other. Without such discernment, if another picture image is recorded on the recorded track, two picture image signals would be mixed and a reproduced picture image would be hardly acceptable because, in the device of this type, it is extremely difficult to precisely align the heads of two picture image signals for synchronization and synchronism tends to be lost.

It is, therefore, highly advantageous for a device of this type to be provided with arrangement to accurately discern a recorded track from a track not recorded and to give a warning when a recording track on which recording is going to be performed has been already recorded; or to automatically prohibit double recording on a recorded track; or, with further advanced arrangement, to shift a track of a recording head to another track, when the track to be used for recording has been already recorded, either by mechanically shifting the head or by electrically shifting the head through change-over between head channels. Such arrangement would automatically ensure that recording can be always performed on a recording track which has not been recorded.

Further, a device of this type is required to have a facility for indicating the number of recorded tracks. If such indication is arranged to be made by directly detecting up to which of the recording tracks recording has been performed and to show the number of recorded tracks according to the result of such detecting, the device must have a complex structure, which then would hinder an effort to make the device compact. In another conceivable arrangement, the recording medium may be placed in a cartridge; a code marking may be attached to a part of the housing thereof every time recording is performed on a recording track; and then the number of recorded tracks may be indicated by detecting the code markings. In this case, it is an advantage that the number of recording tracks that have been recorded can be indicated when the cartridge is once taken out from the recording device halfway during a recording operation thereon and thereafter again put in the device. However, this method is not completely satisfactory because it still unnecessarily complicates the structural arrangement and also might cause an erroneous action when the device is reloaded with the cartridge.

As mentioned in the foregoing, the picture image recording device of the prior arts still require improvement in various points.

SUMMARY OF THE INVENTION

This invention is directed to the solution of the above stated problems and the subject matter of the invention lies in the provision of an improved picture image recording device which is of the type using a recording medium permitting to set a plurality of recording tracks separately from each other for recording picture images on each of these tracks and which is capable of meeting all of the above stated various requirements.

More specifically stated, it is a first object of this invention to provide a picture image recording device for recording still picture images which can be operated to record moving objects and is thus advantageously usable for many purposes.

To attain this object, in accordance with this invention, the picture image recording device is operable at least in two different modes including a first mode in which recording is performed on only one recording track and a second mode in which recording is performed continuously or sequentially on a plurality of recording tracks, the device being arranged to be shiftable between the two modes.

In a preferred embodiment of this invention which will be further described hereinafter, the device is arranged to be shiftable between two different speeds in the above stated second mode. In another embodiment, the device can be used for video recording at an ordinary video recording speed through a combined use of it with a video recording device. These arrangements further enhance the functional capability of a device of this type.

It is a second object of this invention to provide a picture image recording device of the above stated type having an improved feature that double recording on a recording medium, i.e. recording on a recorded track, can be effectively prevented.

To attain this object of the invention, the picture image recording device is provided with a detecting means which, at the time of recording a picture image signal, automatically detects whether or not the recording track of a recording medium on which the picture image signal is going to be recorded has already been recorded.

In this arrangement of the device, the inconvenience of having double recording is prevented by giving a warning against double recording and automatically prohibiting it with an output of the detecting means utilized therefor. Further, in the case of a preferred embodiment of the invention which will be described hereinafter, there is provided a control means which controls shifting of the track of a recording means (change-over from one recording track to another) in response to the output of the detecting means; and the recording track of the recording means is automatically shifted by the control means to a track which has not been recorded. This is very advantageous for a device of this type.

It is a third object of this invention to provide a picture image recording device equipped with a simple, reliable and inexpensive arrangement to automatically indicate the number of tracks of a recording medium which have been already recorded.

In accordance with this invention, this object is attained in the following manner: The recording device is provided with a switching means which shifts image signal recording means for one recording track to another and an indication means which indicates the number of recorded tracks in response to the shifting of the recording means.

In the preferred embodiments of this invention which will be described hereinafter, the switching means mechanically shifts the recording means in relation to the recording tracks while the indication means is mechanically associated with the shifting section of the recording means to indicate the number of recorded tracks; or the above stated recording means is arranged to be a multi-channel recording means which is electrically shiftable between many channels while the above stated switching means is arranged to be an electrical channel switching means and the number of recorded tracks is indicated by causing the above stated indication means to electrically respond to the output of the switching means.

The above and other objects and features of the invention will appear more fully hereinafter from the following description taken in connection with the accompanying drawings wherein embodiments are illustrated by way of example.

BRIEF DESCRIPTION OF THE DRAWINGS

FIG. 5 is a block circuit diagram showing the basic structural arrangement of an image pickup-video signal generation magnetic recording circuitry system which is applicable to the device of the invention.

FIG. 6 is a schematic view showing a CCD image sensor used as solid-state image pickup element in the circuit shown in FIG. 5.

FIG. 7A is a logic circuit diagram showing the logic arrangement of a flip-flop circuit used in the circuit shown in FIG. 7. FIG. 7B shows an input-to-output relation of the flip-flop circuit shown in FIG. 7A.

FIG. 8 is an enlarged oblique view showing the details of structural arrangement of a magnetic head suitable for use in the circuit shown in FIG. 7.

FIG. 9 is a perspective view showing the structural arrangement of an essential part for indicating the number of recorded tracks suitable for the circuit shown in FIG. 7.

FIG. 10 is a timing chart showing an input-to-output relation of a counter and an ADD gate used in the circuit shown in FIG. 7 for producing control signals.

FIG. 11 is a timing chart showing the operation of the essential parts of the circuit shown in FIG. 7 in a mode S (singly image shot) when a cartridge that has not been recorded at all is used.

FIG. 12 is a timing chart showing the operation of the essential parts of the circuit shown in FIG. 7 in the mode S when a cartridge that has been partly recorded is used.

FIG. 13 is a timing chart showing the operation of the essential parts of the circuit shown in FIG. 7 in a mode C1 or C2 (continuous or sequential image shot).

FIG. 14 is a circuit diagram showing the arrangement of an essential part in a modification example of the embodiment shown in FIG. 7.

DETAILED DESCRIPTION OF THE PREFERRED EMBODIMENTS

Figure 1:
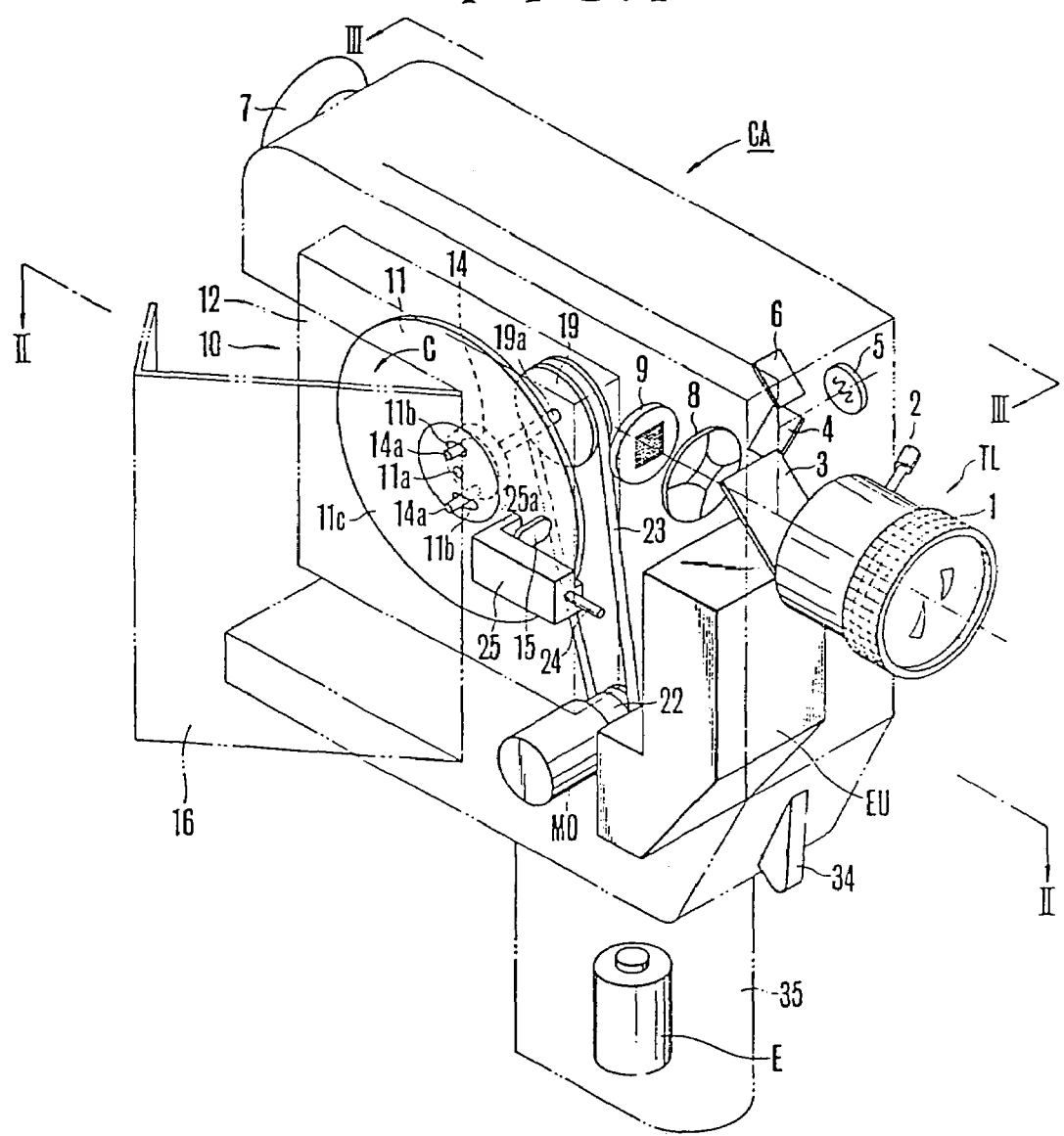
FIG. 1 is a perspective view showing the structural arrangement of an essential part of a camera incorporating a picture image recording device as embodiment of this invention.
Figure 2:
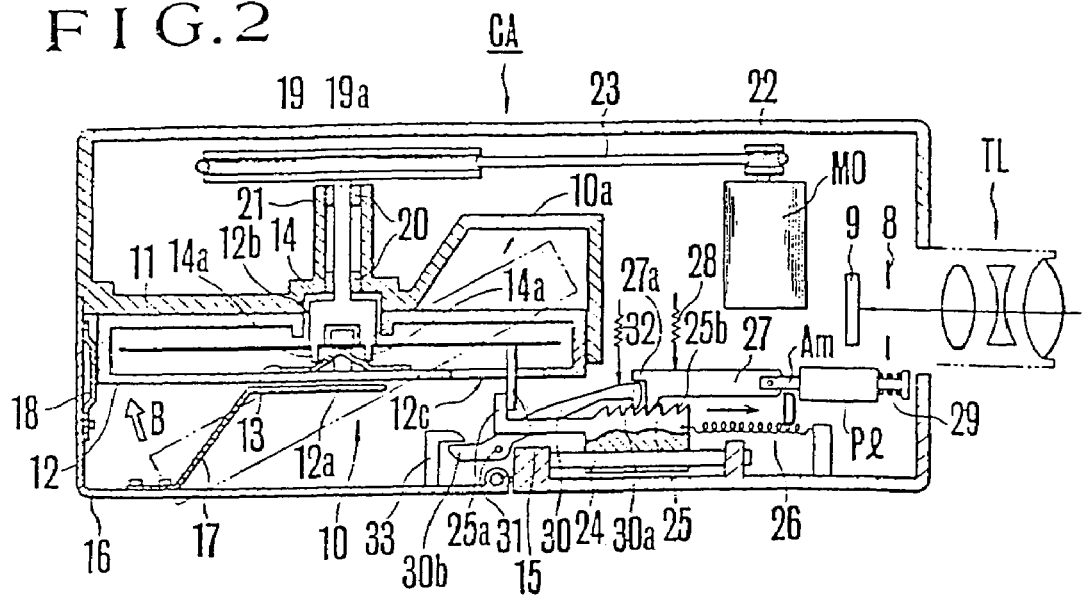
FIG. 2 is a section view taken on line II-II of FIG. 1.
Figure 3:
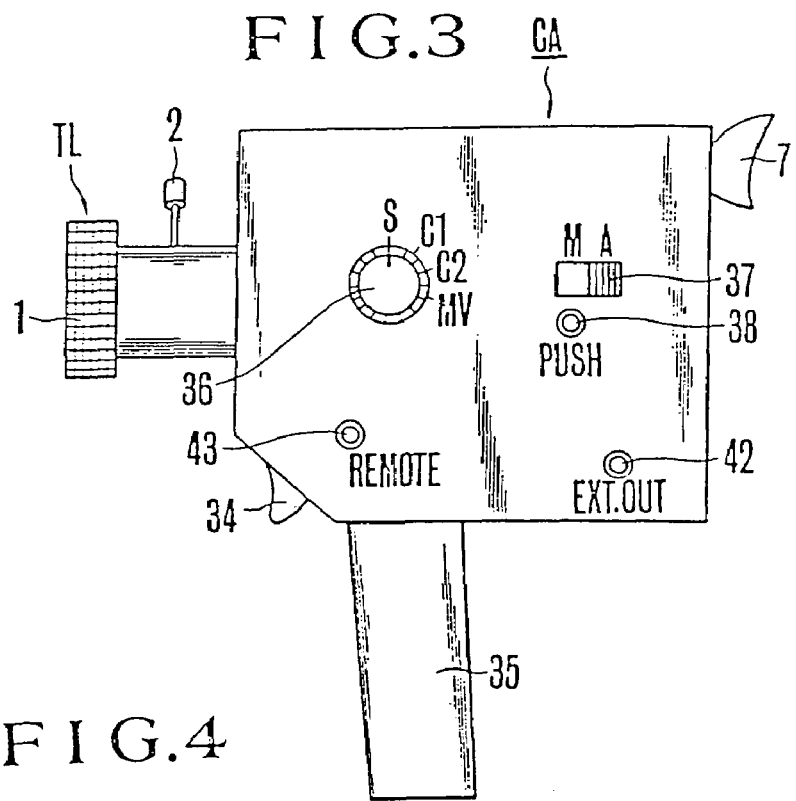
FIG. 3 is a plan view taken on the side indicated by line III-III of FIG. 1.
Figure 4:
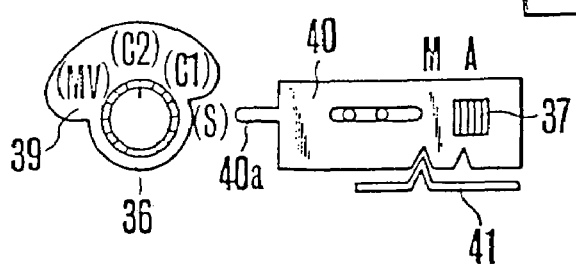
FIG. 4 is a plan view showing interrelation between a mode selection dial and a mode selection slide shown in FIG. 3.

Referring to the accompanying drawings, preferred embodiments of the invention are described by way of example as shown below:

The embodiment described here are examples where the present invention is applied to a handy camera. Referring first to FIGS. 1-3, a reference symbol CA indicates the camera; TL indicates a picture taking lens; a reference numeral 1 indicates a focusing ring; 2 indicates a zooming operation rod; 3 indicates a semi-transparent mirror which is provided for taking out a view finder light and is disposed obliquely within a camera body in the rear of the picture taking lens L; and 4 indicates a semi-transparent mirror provided in the path of a reflection light coming from the mirror 3 for the purpose of taking out a photometric light. A light measuring element 5 is positioned to receive a reflection light of the mirror 4. Behind a total reflection mirror, there is arranged a view finder optical system of a known structure. A reference numeral 7 indicates an eye cup which is provided for the view finder. Behind the above stated mirror 3, there is provided a picture taking diaphragm which is arranged to permit complete stopping in this particular embodiment. A numeral 9 indicates a CCD image sensor employed as solid-state image pickup element. In this embodiment, the image sensor is a two dimensional image pickup CCD of the known frame transfer type is employed as shown in FIG. 6. Further, as will be described hereinafter, in front of an image pickup part of the CCD image sensor 9, there are disposed a lenticular lens and a color stripe filter in a known manner. There is provided a cartridge loading chamber 10 which is arranged to place therein a magnetic recording cartridge 12 containing therein a magnetic recording disc 11 in a freely rotatable manner. As shown in FIG. 2, the shaft 12a of the cartridge 12 is arranged to rotatably carry the disc 11. In the housing of the cartridge, there are provided a central opening 12b which is provided for receiving a disc driving spindle 14 of the camera CA and a slot 12c which is arranged to receive a magnetic head 15 provided on the side of the camera CA. As shown in FIG. 1, the disc 11 is provided with a center hole 11a at which the disc is rotatable carried by the shaft 12a. The disc 11 is further provided with an arcuate slot 11b which is arranged concentrically with the center hole 11a. With this arrangement, the disc 11 is urged toward the central opening 12b by a plate spring 13 which is provided within the cartridge 12 as shown in FIG. 2. Further, as indicated by a numeral 10a in FIG. 2, the rear part of the cartridge loading chamber 10 is recessed to permit insertion of the cartridge 12 into the cartridge loading chamber 10 with a lid 16 of the chamber opened in an oblique the cartridge, the cartridge is lodged in place in a normal posture with the spindle 14 inserted into the central opening 12b and the magnetic head 15 into the slot 12c respectively.

Then, the tip of the head 15 is in contact with a magnetic recording part 11c of the disc 11. The recording part 11c can be set by arranging thereon a plurality of, say, 40 recording tracks in a state of being separated from each other. Each of the recording tracks is arranged to permit recording thereon magnetic signals for one frame of a still picture as will be further described hereinafter. The disc 11 itself has a flexibility to receive the head pressure of the head 15 with the resilience of the disc 11. With the loading chamber lid 16 closed, the cartridge 12 is fixedly and correctly set in place by the plate springs 17 and 18 shown in FIG. 12. The disc driving spindle 14 is provided with a driving pin 14a which is engageable with the arcuate slot 11b provided in the disc 11 and the spindle 14 is connected to the shaft 19a of a fly wheel 19. The fly wheel shaft 19a is borne by a bearing metal member 20 at a boss part 21 of the camera frame to have no rotational chattering nor thrust chattering. This arrangement is important because the image recording performance of the device would be greatly affected by such chattering of this shaft 19a. There is provided a motor Mo which is arranged to rotate the fly wheel 19. Because an output pulley 22 of the motor Mo and the fly wheel 19, there is provided a rubber belt 23. With a driving system arranged in this manner, the disc 11 is driven to rotate in the direction of an arrow C indicated in FIG. 1. A numeral 25 indicates a head carrying member which is arranged to hold the above started head 15 at its bent arm part 25a provided at the fore end thereof. The head carrying member 25 is carried by a supporting rod 24 to be slidable along the rod 24, which is attached to a part of the camera frame along the slot 12c of the cartridge 12. A spring 26 urges the head carrying member 25 in the direction of an arrow D indicated in FIG. 2. The head carrying member 25 is provided, at a part thereof, with ratchet teeth 25b which are formed to define spacing between the magnetic recording tracks in the recording part 11c of the magnetic recording disc 11. Further, with the head carrying member 25 displaced to an extreme and position thereof in the direction of the arrow D indicated in FIG. 2 by the spring 26, the magnetic head is arranged to be in a position corresponding to the outermost peripheral track of the recording part 11c of the disc 11. The number of teeth of the ratchet 25b is determined in accordance with the number of tracks set on the disc 11 and, in this embodiment, the number of the ratchet teeth is 41 for the 40 tracks of the disc. Accordingly, the head 15 has a total of 41 setting positions. A numeral 27 indicates a ratchet feeding claw which is arranged to shift the head carrying member 25 tooth by tooth against the force of the spring 26 in the direction reverse to the direction of the arrow D. The ratchet feeding claw 27 is urged in the direction of engaging with the ratchet teeth 25b by a spring 28 and is also is linked with a movable armature Am of a plunger Pl. When the plunger is energized, the armature Am is arranged to thrust forward by one stroke which shifts the above stated head carrying member 25 exactly as much as one tooth against the force of a spring 29 in the direction opposite to the arrow D. The head carrying member 25 is arranged to be retained in the shifted position by a lock claw 30, which is pivotally carried to be freely rotatable on a shaft 31 attached to a part of the camera frame and is urged by a spring 32 in the direction of engaging the ratchet teeth 25b. When the loading chamber lid 16 is opened, the head carrying member 25 is caused by a reset member 33 to automatically return to an initial position in which the head 15 is facing the outermost track of the disc 11. The head portion of the reset member 33 is formed into a tapered or circular shape into a hook part and the reset member 33 is attached to a part of the chamber lid 16 to have its hook part engage with the tail end 30b of the lock claw 30. Therefore, when the lid 16 is opened, the reset member 33 causes the lock claw 30 to rotate counterclockwise as viewed on the drawing against the force of a spring 32. At that time, the head part 30a of the force end of the lock claw 30 pushes a protrusion 27a of the fore end of the feed claw 27 to rotate the feed claw 27 clockwise as viewed on the drawing on a point at which the feed claw 27 is linked with the armature Am. Thus, both the lock claw and the feed claw are disengaged from the ratchet teeth 25b. By this, the head carrying member 25 is automatically returned into its initial position as mentioned in the foregoing. This reset member 33 has some flexibility and, when the lid 16 is opened to a degree more than a given angle, the reset member 33 is disengaged from the lock claw 33 and, when the lid 16 is closed, the head part of the reset member 33 comes to contact and override the tail end 30b of the lock claw 30 to bring the hook part thereof into engagement with the tail end 30b. It is therefore advantageous to have the edge of the tail end 30b of the lock claw 30 rounded as shown in FIG. 2. Further, although it is not clearly shown in the drawing, the lock claw 30 is prevented from abutting upon the fore end face of the feed claw 27 by disposing it a little away from the feed claw 27 in the direction perpendicular to the surface of paper on which FIG. 2 is drawn. Meanwhile, the protrusion 27a of the fore end of the feed claw 27 is somewhat extended in the direction perpendicular to the paper surface to have this extended part engageable with the head part 30a of the lock claw 30.

Further, in FIGS. 1 and 3, a numeral 34 indicates a camera trigger button which is of the so-called two step trigger type; and 35 indicates a grip part which is arranged to contain a power source battery E therein. In FIG. 1, a symbol EU indicates an electrical circuit unit the details of which will be described hereinafter. In FIG. 3, a numeral 36 indicates a mode selection dial which is arranged to be shiftable between positions of indices "S", "C1", "C2" and "MV". The index "S" indicates a single picture frame shot; C1 indicates continuous picture frame shots which are performed, for example, at a rate of about 3.3 picture frames per second; and MV indicates picture taking performed at a rate of 30 picture frames per second, which corresponds to motion picture shots at a normal video recording speed. The term "shot" as used herein means a picture taking operation. Further, as will be further described hereinafter, one picture frame is composed of two field signals. A numeral 37 indicates a slide which is slidable for selection between automatic shifting and manual shifting of the head 15 in relation to the recording tracks for the single picture frame shot and which is thus shiftable between indices "A" and "M". The index "A" A numeral 38 indicates a push button which is provided for manual shifting of the head 15 when the manual shift mode M has been selected. The push button 33 permits manual operation of the plunger Pl through circuit arrangement as described hereinafter. In the mode C1, C2 or MV, it is evidently absurd to manually shift the head 15. Therefore, in this embodiment, the slide 37 is inhibited from shifting from "A" to "M" in the mode C1, C2 or MV and is allowed to shift to "M" in the mode S only. When the mode is shifted from "S" to "C1", "C2" or "MV" while the slide 37 is in the position "M", the slide 37 is automatically reset into the position "A" by a can 39 which is interlocked with the dial 36. This cam 39 is disposed to face a follower part 40a of a plate 40 which is arranged for pin-slot engagement and on which the slide 37 is provided. A numeral 41 indicates a click stop spring. The mode symbols marked on the cam 39 in parentheses indicate the region of the cam corresponding to each mode.

Again referring to FIG. 3, there is provided a jack 42 for taking out a video signal (NTSC signal) to the outside. The jack 42 permits to connect an ordinary VTR device thereto and is usable particularly in the mode MV. As mentioned in the foregoing, the number of picture frames recordable on the disc 11 is limited to 40 or thereabout. If a motion picture is recorded on the disc 11 at a standard video recording speed, the recording will not last more than one second or thereabout. The number of recording tracks may be increased. However, such increase is evidently limited. It is absurd to record a motion picture on a disc to begin with. With the jack 42 provided in combination with the mode MV, therefore, motion picture recording can be performed over a long period of time in combination with an ordinary known VTR (video tape recording) device. This arrangement further broadens the functional capability of the camera. There is also provided a jack 43 for remote control. A remote controller is connected to this jack 43.

The structural arrangement of the essential parts related to this invention in the camera CA is as described in the foregoing. The details of the circuit arrangement in the above stated electrical circuit until HU will be understood from the following description:

In FIG. 5 which shows the arrangement of an image pickup—video (NTSC) signal generation—magnetic recording system, a reference numeral 44 indicates an oscillator circuit which generates clock pulses of a relatively high frequency of the order of MHz. A numeral 45 indicates a synchronization control circuit which produces various synchronization control signals required for synchronization control over the image sensor 9 and the circuitry shown here in accordance with the clock pulses from the oscillator circuit 44. As shown in FIG. 6 in a modelizing manner, the CCD image sensor 9 comprises an image pickup part (a photo sensitive part) 9a which is composed of many photo sensor elements arranged in a matrix like manner: a memory part 9b which takes in an electric charge cor-esponding to the brightness of each of the picture elements accumulated at the image pickup part 9a and which thus stores the electric charge in a memory cell at an address corresponding to the address of each element; and an analog shift register 9c which is provided for transferring the stored electric charges in a time serial manner. As well known, with the exception of the image pickup part 9a, all components of the image sensor 9 are part 9a, there are arranged a color stripe filter 48 and a lenticular lens 49. The synchronization control circuit 45 supplies the CCD image sensor 9 with driving signals Pa including a signal for controlling the accumulation of electric charges at the image pickup part 9a; clock pulses for transferring the accumulated electric charges of the image pickup part 9a to the memory part 9b within an extremely short period of time at a predetermined timing, for example every 1/60 sec. (which corresponds to the timing of a vertical synchronization signal); and clock pulses for time serially producing all of the electric charges taken in the memory part 9b through the shift register 9c within a period of 1/60 second which corresponds to the time of 1 V—1 vertical scanning period of television (i.e. for read-out of the stored electric charges). Further, although it is not shown in FIG. 6, it goes without saying that the electric charges that are transferred by the shift register 9c are eventually obtained in a state of having been converted into voltages or currents or the like. Further detailed description is omitted herein as the frame transfer type CCD image sensor of this type has already been well known.

Returning now to FIG. 5, numerals 50 and 51 indicate sample-hold circuits which sample-hold the output of the CCD image sensor 9. These sample-hold circuits are arranged to be controlled by control signals Pb (sampling signals) from the synchronization control circuit 45. A numeral 52 indicates a video signal (NTSC signal) generating circuit which is composed of: A brightness signal producing circuit 53 which produces a brightness signal Y in accordance with the output of the sample-hold circuit 50; a color signal producing circuit 54 which produces primary color signals R and B in accordance with the output of the sample-hold circuit 51; and an encoder 55 which produces a NTSC signal (a color video signal of NTSC system) based on the signals Y, R and B received from these circuits 53 and 54. As well known, the synchronization control circuit 45 supplies synchronization control signals Pc and Pd to the color signal producing circuit 54 and the encoder 55. The video signal generating circuit of this type has been thoroughly known through prior art disclosure such as a Japanese patent application laying open publication No. SHO 53-34417. Therefore, illustration of the circuit herein is limited to functional blocks. A numeral 56 indicates a magnetic recording circuit for recording video signals. The magnetic recording circuit 56 is composed of a low pass filter 57, a pre-emphasis circuit 58, a frequency modulation circuit 59, a high pass filter 60, a band pass filter 61, a frequency converter circuit 62, a low pass filter, a mixer circuit 64 and a recording amplifier 65. The magnetic recording circuit 56 is thus arranged to be also-called chrominance subcarrier low conversion multiplex recording system. The operation of the circuit of this system is well known and does not require detailed description here. Briefly stated, when the NTSC signal, i.e. a combined color video signal, is obtained from the above stated video signal generating circuit 52, a brightness signal Y and a chrominance subcarrier signal fc of 3.58 MHz are separated from the video signal through the low pass filter 57 and the band pass filter 61 respectively. The separated brightness signal Y is pre-emphasized by the pre-emphasis circuit 58 and, after it is frequency modulated by the frequency modulation circuit 59, the signal Y is supplied to the mixer circuit 64 as frequency modulated brightness signal with a part of its lower-side band wave removed through the high pass filter 60. On the other hand, the chrominance subcarrier signal fc is balance modulated at the frequency converter circuit 62 by a signal Pe (fn) coming from the synchronization control circuit 45. Then, through the low pass filter 63, a difference signal thereof, i.e. a low conversion chrominance subcarrier signal $f_s=f_n-f_c$ is taken out and supplied to the mixer circuit 64. The mixer circuit 64 then mixes the color signal carried by this low conversion chrominance subcarrier $f_s$ with the frequency modulated (FM) brightness signal from which a part of its lower-side band wave has been removed to obtain a mixed signal (a VTR signal). The mixed signal is applied to the head 15 through the amplifier 65 to perform magnetic recording of it on a recording track of the disc 11.

Figure 7:
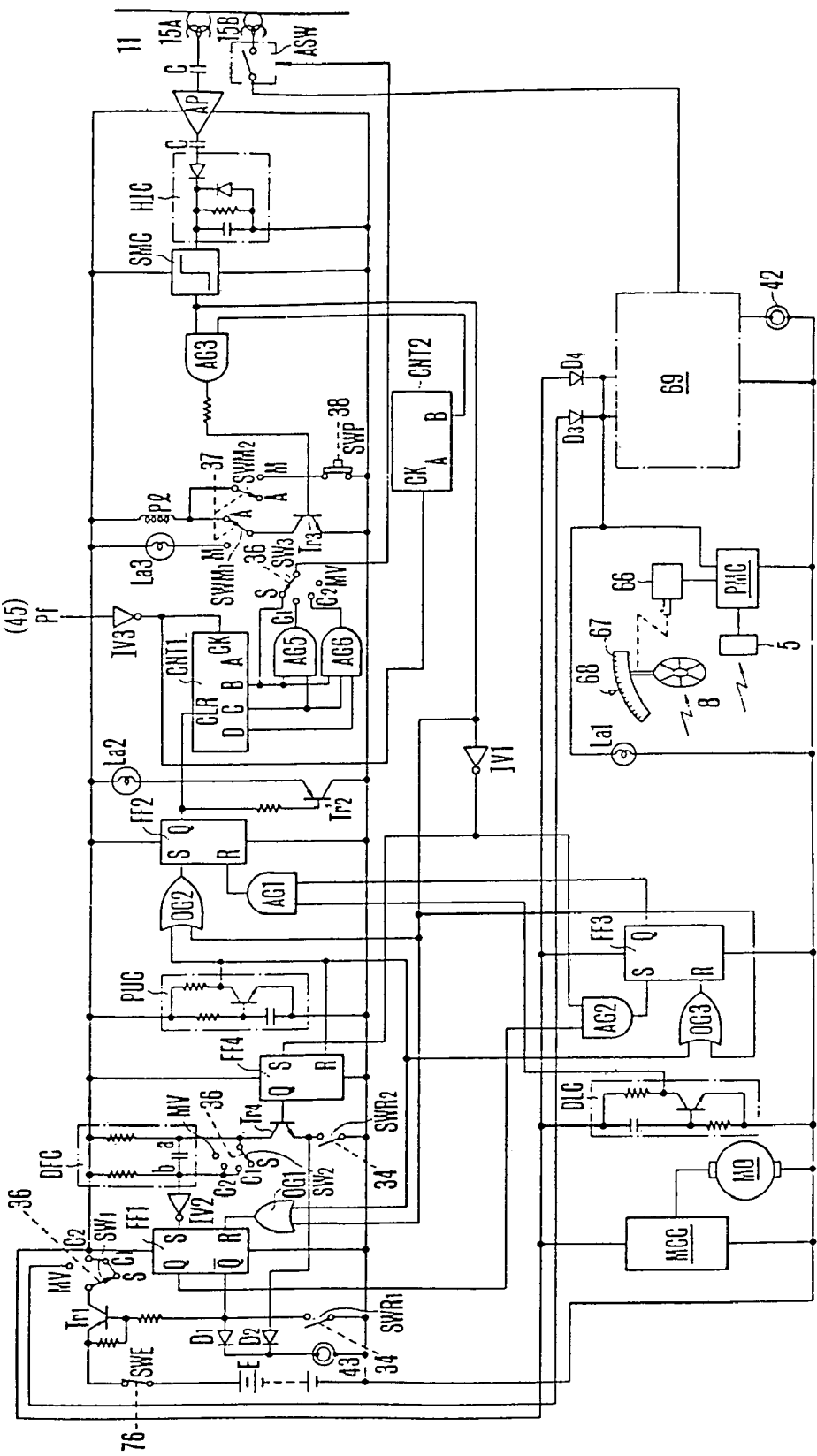
FIG. 7 is a circuit diagram showing the arrangement of an electrical circuitry employed in one embodiment of the invented device.

Next, referring to FIG. 7, the structural arrangement described in the foregoing will be more fully understood from the following description of a concrete example of the electrical circuit system:

In the first example given here, a combination type magnetic head is employed as the above stated magnetic head 15. The combination magnetic head is composed of a detection head 15A which is provided solely for the purpose of detecting whether or not a magnetic recording track of the disc 11 on which a picture image signal is going to be recorded (hereinafter will be called "picture recording") has already been recorded with a picture and a recording head 15B which is provided solely for the purpose of recording. When the disc 11 rotates in the direction of the arrow C shown in FIG. 1, the detection head 15A is arranged to be always positioned ahead of the recording head 15B. In recording, when the track has been already recorded, double recording is prevented by this arrangement to ensure correct recording on a track that has not been recorded.

In FIG. 7, a reference symbol E indicates the circuit power source mentioned in the foregoing; and SWE indicate a normally closed type end switch which is arranged to be opened upon completion of picture recording on all of the tracks of the disc 11. The switch SWE is connected in series with the circuit power source E. As for the arrangement required for opening this end switch SWE, the use of the arrangement shown in FIG. 9 or something like that will be advantageous. In the case of FIG. 9, there is provided a track count member 72 which is arranged to sway in response to the feeding action of the head carrying member 25 with its tail end pivotally connected to a part of the camera frame and with a pin 71 on the head carrying member 25 engaged with a slot 72a provided in the middle part of the count member 72. A pointer 73 which is attached to the fore end of the count member 72 indicates the number of recorded tracks on a track number indicating graduation plate 75 which is disposed inside a window 74. Further, when the head carrying member 25 is shifted to the left as viewed on the drawing to an extent as much as the total number of the teeth of the ratchet teeth 25b, i.e. when it comes away from the innermost circular track of the recording part 11c of the disc 11 and is shifted further inward by one tooth, the end switch SWE is opened by a switch opening protrusion 76 provided on the fore end of the count member 72.

A PHP switching transistor Tr1 has its emitter side connected to the end switch SWE. A symbol SWR1 indicates a normally open type first step trigger switch which is arranged to be turned on by the first step stroke of the above stated trigger button 34 and which is connected to the base of the transistor Tr1. A symbol SW1 indicates a change-over switch which is shiftable between fixed terminals S, C1, C2 and MV in response to the above stated mode selection dial 36. The movable contact piece of the switch SW1 is connected to the collector side of the transistor Tr1. The fixed terminals S, C1 and C2 are connected in common. A symbol PUC indicates a power up clear circuit which produces a single pulse (a power up clear signal) when the power source is turned on; DFC indicates a differentiation circuit which produces a negative single pulse when its terminal a is connected to the minus side of the power source E; SW2 indicates a change-over switch which is shifted between fixed terminals S, C1, C2 and MV in response to the mode selection dial 36, the terminals S and MV being neutral terminals, the terminals C1 and C2 being connected to the output terminal b of the above stated differentiation circuit DFC and the movable contact piece thereof being connected to the terminal a of the differentiation circuit PFC; and FF4 indicates a SR-flip-flop which receives the output of the power up clear circuit PUC at its react input terminal R and receives, at its set input terminal S, the output of an inverter IV1 which is provided for producing the output of a Schmidt circuit SMC (will be described hereinafter) by inverted logic. The Q output of the SR-flip-flop is arranged to be supplied to the base of an NPN switching transistor Tr4 the collector side of which is connected to the movable contact piece of the above stated change-over switch SW2. A symbol SWR2 indicates a second step trigger switch which is arranged to be turned on by the second step stroke of the above stated trigger button and is connected to the emitter of the transistor Tr4; and FF1 indicates a SR-flip-flop which is arranged to receive, at its set input terminal S, the output of the inverter IV2 provided for producing the output of the above stated differentiation circuit DFC by inverted logic and is arranged to receive, at its reset terminal P, the output of an OR gate OG1 which obtains a logical sum of the output of the above stated power up clear circuit PUC and the output of the Schmidt circuit SMC which will be described hereinafter, the SR-flip-flop FF1 thus being arranged to maintain power supply. The $\overline{Q}$ output terminal of the flip-flop is connected to the base of the above stated transistor Tr1. When the second step trigger switch SWR2 is turned on under a condition in which the output of the OR gate OG1 is low and the $\overline{Q}$ output of the flip-flop FF4 is high (i.e. a condition in which the transistor Tr4 is rendered conductive with the second step trigger switch SWR2 turned on), the flip-flop FF1 is set by a high level output of the inverter IV2 and the $\overline{Q}$ output of the flip-flop FF1 becomes low. Then, since the $\overline{Q}$ output terminal is connected to the base of the transistor Tr1, the transistor Tr1 is held conductive by the depression of the trigger button 34 to the second step stroke and does not become nonconductive when the trigger button 34 is instantly released from depression. The transistor Tr1 is released from this state of being held conductive when the detection head 15A detects a recorded track as will be described hereinafter. Therefore, at this time, if the first step trigger switch SWR1 is off, the transistor Tr1 becomes nonconductive to cut off power supply to the circuit system.

There is provided a SR-flip-flop FF2 for recording control. The set input terminal S of the flip-flop FF2 receives the output of an OR gate OG2 which obtains a logical sum of the output of the above stated power up clear circuit PUC and the output of the Schmidt circuit SMC while the reset input terminal R of the flip-flop FF2 is arranged to receive the output of an AND gate AG1 which obtains a logical product of the output of a delay circuit DLC which will be described hereinafter and the Q output of a flip-flop FF3 which will also be described hereinafter. A symbol CNT1 indicates a 4-bit binary counter of a pulse fall synchronization type. The counter CNT1 counts the output pulses (FIG. 10, (b)) of an inverter IV3 which produces, by inverted logic, the pulses Ff (FIG. 10, (a)) at a timing (1/60 sec.) corresponding to the vertical synchronization signal from the synchronization control circuit 45 shown in FIG. 5. With this counting performed, the output terminals A, B, C and D of the counter CNT1 respectively produce pulse signals as represented at (c), (d), (e) and (f) in FIG. 10. A symbol AG5 indicates an AND gate which obtains a logical product of the outputs B and C of the above stated counter CNT1. The output of the AND gate AG5 is as represented by (g) in FIG. 10. Another AND gate AG6 is arranged to obtain a logical product of the outputs B, C and D of the counter CNT1. The output of the AND gate AG6 is as represented by (h) in FIG. 10. Therefore, assuming that the period of the output pulse Pf of the above stated synchronization control circuit 45 represented by (a) in FIG. 10 is 1/60 sec., the period of the output A of the counter CNT1 is 1/30 sec., that of the output B of the counter is 1/15, that of the output C of the counter is 1/7.5 and that of the output D of the counter is 1/3.75. Then, since the time, at a high level, of each of the output B of the counter CNT1 and outputs of the AND gates AG5 and AG6 is 1/30 sec., these outputs are usable as recording control signal in the modes S, C1 and C2 respectively. The output B of the counter CNT1 and the outputs of the AND gates AG5 and AG6 are arranged to be selectable in the modes S, C1 and C2 by the change-over switch SW3 which is responsive to the mode selection dial 36. Although the period of the output of the AND gate AG5 which is selected in the mode C1 is 1/7.5 sec. and the period of the output of the AND gate AG6 which is selected in the mode C2 is 1/3.75 sec., these periods are arranged in the circuit of this embodiment to be about 6 picture images/sec. in the mode C1 and about 3.3 picture images/sec. in the mode C2 for effecting continuous shots.

Further, each of the output B of the counter CNT1 and outputs of the AND gates AG5 and AG6 selected by the switch SW3 is supplied to the output stage (i.e. the amplifier circuit 65 shown in FIG. 5) of the image pickup—video signal generation—magnetic recording system circuit 69 which is arranged as shown in FIG. 5 and also to the recording control analog switch ASW which is provided between the recording head 15B and the circuit 69 to perform recording control thereby. The clear terminal CLR of the above stated counter CNT1 is arranged to receive the Q output of the above stated flip-flop FF2. Accordingly, when the Q output of the counter CNT1 is high, the counter CNT1 is kept in a state of being cleared. The counter CNT1 thus counts the output pulses of the inverter IV3 only when the Q output of the flip-flop FF2 is low.

A symbol La2 indicates a display lamp which is caused to light up by the PNP switching transistor Tr2 arranged to receive the Q output of the flip-flop FF2 at its base. In other words, the display lamp La2 is caused to light up to indicate that recording is being performed when the counter CNT1 is performing a counting operation with the Q output of the flip-flop FF2 being low. A symbol AP indicates an amplifier which amplifies the output of the above stated detection head 15A; C indicates a DC out capacitor; HIC indicates a rectifying integration circuit HIC which rectifies and integrates an AC signal component, i.e. a video signal component in the output of the amplifier AF; and SNC indicates a Schmidt circuit which is responsive to the output of the rectifying integration circuit HIC. The output of the Schmidt circuit becomes high when the track on which recording is going to be performed has been already recorded and become low when the track has not been recorded. The output of the Schmidt circuit SMC is supplied to the AND gate AG3 and the OR gates OG1, OG2 and OG3 and, through the inverter IV1, is supplied by inverted logic also to the AND gate AG2 and the set input terminal S of the flip-flop FF4. A symbol CNT2 indicates a 2-bit binary counter of a pulse fall synchronization type which receives and counts the output pulses from the above stated inverter IV3. The higher bit output, i.e. the output B, of the counter CNT2 is arranged to be used for driving the above stated plunger Pl and is supplied to the other input terminal of the above stated AND gate AG3. The output of the AND gate AG3 is supplied to the base of the NPN switching transistor Tr3. The output B of the counter CNT2 has a high level duration period of 1/30 sec. in the same manner as the output B of the other counter CNT1. Therefore, with a minimum energization period required for driving the plunger Pl arranged to be 15 to 20 msec. or thereabout, the output B of the counter CNT2 gives a sufficient pulse for driving the plunger Pl. Further, the time constant of the above stated integration circuit HIC is set at a sufficient value of time, say, 30 msec. or thereabout for driving the plunger Pl. There is provided a display lamp La3 which lights up when the track going to be recorded has been already recorded in the mode S-M, i.e. in the mode of single picture image shot with manual shifting of the head. In the mode M, the display lamp La3 is connected to the collector of the transistor Tr3 by the switch SWM1 which is responsive to the above stated slide 37. In the mode A, the switch SWM1 connects the plunger Pl to the collector of the transistor Tr3. A symbol SWP indicates a push switch which is turned on by the above stated push button 33; and SWM2 indicates a switch which, in the mode M, connects the switch SWP to the plunger Pl in response to the above stated slide 37.

A motor control circuit MCC is provided for constant speed control of the motor Mo. In this embodiment, the rotation speed of the motor Mo is controlled by the control circuit MCC to have the disc 11 rotate at a speed of 1,800 r.p.m. so that signals for one frame, i.e. for two fields, are recorded on a track by every rotation of the disc 11. A delay circuit DLC is provided for having a delay time corresponding to a period of time (50-100 msec.) required for building up of the speed of the motor Mo. The output of the delay circuit is supplied to the AND gate AG1. A symbol FF3 indicates a SR-flip-flop. The set input terminal S of the flip-flop FF3 receives the output of the AND gate AG2 which obtains a logical product of the Q output of the flip-flop FF1 and the output of the inverter IV1. The reset input terminal R of the flip-flop FF3 receives the output of the OR gate OG3 which obtains a logical sum of the output of the above stated power up clear circuit PUC and the output of the Schmidt circuit SMC. The Q output of the flip-flop FF3 is supplied to the AND gate AG1. A symbol PMC indicates a light measuring circuit which determines a correct diaphragm aperture value based on the output of a light measuring element 5 and electric charge accumulation time (i.e. integrated time of picture element signals) obtained at the image pickup part 9a of the image sensor 9. The light measuring circuit PMC is arranged to receive power supply together with the above stated circuit 69 through the diode D3 or D4 irrespective of the mode selection of the mode selection dial 36, i.e. irrespective as to which of the mode terminals is in connection with the switch SW1. In this embodiment, the electric charge accumulation time is defined solely by the timing of the read-out starting pulse (start pulse) included in the sensor driving signal Pa which is produced by the synchronization control circuit 45. According to the example described in the foregoing, for example, the electric charge accumulation time is fixed to ⅟₆₀ sec. or thereabout. In this case, therefore, fixed information on this time is given to the light measuring circuit PMC. Incidentally, this time corresponds to film exposure time in an ordinary camera that uses a silver salt film. Accordingly, the same structural arrangement as a known light measuring circuit of a film camera is usable as this light measuring circuit PMC. A reference numeral 66 indicates a diaphragm driving means such as a meter or motor which adjusts a diaphragm 8 to a correct aperture value in response to the output of the light measuring circuit PMC. The output shaft of the diaphragm driving means is connected to the diaphragm 8. The diaphragm 8 is arranged to permit so-called complete stopping for the purpose of preventing so-called "sticking" of the CCD image sensor 9. As for arrangement required for such complete stopping, in the case of using a meter as diaphragm driving means 66, a spring may be arranged to act on the moving coil thereof such that the diaphragm 8 is kept in a completely stopped state when the coil is not energized. Where a motor is employed as the driving means 66, a condensing means such as a capacitor may be connected to the motor to completely stop the diaphragm 8 by forcedly driving it with the holding power of this condensing means imparted when the output from the light measuring circuit is cut off. A numeral 67 indicates a graduation member for indicating aperture values. The member 67 is arranged to be driven together with the diaphragm 8 by the above stated diaphragm driving means 66 and is prepared, for example, by marking graduations of aperture values on a transparent film or the like. The member 67 is disposed within a view finder of the camera and is arranged to show an adjusted value of aperture of the diaphragm by coincidence of a graduation mark with a fixed index 68. A symbol La1 indicates a lamp which is provided for illuminating the above stated graduation member 67 from behind it and is connected to the diodes D3 and D4. The lamp La1 is arranged to receive power supply to light up with the transistor Tr1 energized irrespective of the mode selected by the mode selection dial. Therefore, in addition to its function of illuminating the graduation member 67, the lamp La1 functions also to indicate that the trigger button 34 is depressed to the first step thereof.

In the arrangement described in the foregoing, the circuit 69, the light measuring circuit PMC and the lamp La1 are arranged to receive power supply with the transistor Tr1 rendered conductive energized irrespective of the mode position in which the mode selection dial 36 is set. On the other hand, with the exception of them, other circuits are arranged to receive power supply, with the transistor Tr1 rendered conductive, only when the mode selection dial 36 is in the mode position, S, C1, or C2. Further, each of the SR-flip-flop circuits FF1-FF4, which are used in the circuit shown in FIG. 7, has a logic arrangement made by a combination of two NOR gates NOG1 and NOG2 as shown in FIG. 7A. The input-to-output relation of the flip-flop circuit is as shown in FIG. 7B.

A jack which is provided for supplying the NTSC signal to the outside is connected to the circuit 69 and, more specifically stated, to the output stage of the video signal generation circuit 52 shown in FIG. 5. A remote jack 43 is connected through diodes D1 and D2 in parallel with the switches SWR1 and SWR2.

The camera which has the structural arrangement as described in the foregoing operates—in the following manner: As mentioned in the foregoing, the camera permits selection of any of the five operation modes including the mode S-A (single picture image shot—automatic head shifting), the mode S-M (single picture image shot—manual heading shifting), the mode C1 (continuous shots at a rate of 7.5 picture images/second), the mode C2 (3.75 picture image/sec. continuous shots) and the mode MV (motion picture shots at a VTR speed using a VTR device). To facilitate understanding, the mode S-A is first described with reference to the timing chart of FIG. 11 as follows: Let us assume that the camera CA is loaded with a recording disc 11 with none of the recording tracks thereof having been recorded. The head 15 is set in its initial position as mentioned in the foregoing. The end switch SWE is therefore on. Under this condition, when the dial 36 is set in the mode position S, the switch SW1 is turned on; the switch SW2 comes to be in an open state while the switch SW3 comes to be connected to the output terminal B of the counter CNT1. Then, when the slide 37 is set in the position of the mode A, the switch SWM1 is connected to the side of the plunger Pl while the switch SWM2 comes to be in an open state and the camera CA is set in the mode S-A. Under this condition, the operator directs the camera CA toward a desired object while peeping into the view finder and, when he depresses the trigger button 34 to the first stroke, the first step trigger switch SWR1 is turned on to render the transistor Tr1 conductive thereby. Accordingly, the light measuring circuit PMC comes to work and the diaphragm 8 is adjusted from its completely stopped state to a correct aperture value. Meanwhile, the lamp La1 lights up to illuminate the graduation plate 67 and the motor Mo starts to cause the disc 11 to rotate. This shown in FIGS. 11(a), (b), (d), (e) and (f). Further, when the transistor Tr1 is rendered conductive, the power up clear circuit PUC produces pulses as shown in FIG. 11(g) to reset thereby the flip-flop circuits FF1, FF3 and FF4 and to set the flip-flop FF2. Then, the Q output of the flip-flop FF1 and the Q output of the flip-flop FF2 become high as shown in FIGS. 11(k) and (l). On the other hand, with the transistor Tr1 rendered conductive, the circuit 69 receives power supply and begins to drive the CCD image sensor 9, which then begins the image pickup—video signal generation—VTR signal producing operation. At this time, the synchronization control circuit 45 produces pulses Pf of timing which corresponds to the vertical synchronization signal as represented by FIG. 11(o). The pulses Pf are applied to the counters CNT1 and CNT2 through the inverter IV3. However, since the Q output of the flip-flop FF2 at this time is high, the counter CNT1 is in a cleared state, i.e. kept in a state of being incapable of counting. Thus, the pulses are not counted by the counter CNT1. Accordingly, the output B of the counter CNT1 is low as shown in FIG. 11(p). The analog switch ASW is, therefore, remains off. On the other hand, the counter CNT2 then begins to count the output pulses from the inverter IV3. Further, with the transistor Tr1 rendered conductive when a period of time anticipated to correspond to time required for the motor Mo before it comes to build up to a normal speed has elapsed, the output of the delay circuit DLC becomes high as shown in FIG. 11(h) and, accordingly, one input to the AND gate AG1 then becomes high.

At this time, in the output of the detection head 15A, there appears no AC signal component because the disc 11 has not been recorded at all. Therefore, the output level of the integration circuit HIC is below a predetermined level and, accordingly, the output of the Schmidt circuit SMC is low as shown in FIG. 11(g). Therefore, the plunger Pl is not energized. The heads 15A and 15B are in their initial positions where they are in contact with the outermost track of the recording part 11c of the disc 11. Further, since the output of the inverter IV1 becomes high at this point of time, one input to the AND gate AG2 becomes high. The flip-flop FF4 is set and the Q output of it becomes high.

Under this condition, when the trigger button 34 is depressed to the second step (FIG. 11(a)), the second trigger switch SWR2 is turned on, as shown in FIG. 11(c), to render the transistor Tr4 conductive. This causes the differentiation circuit DFC to produce a negative pulse as shown in FIG. 11(h). Accordingly, as shown in FIG. 11(i), the inverter IV2 comes to produce high pulses. By this, the flip-flop FF1 is set and, as shown in FIG. 11(j), the Q output of the flip-flop FF1 becomes high. The output of the AND gate AG2 thus becomes high at this point of time to set the flip-flop FF3 and the Q output of the flip-flop FF3 becomes high as shown in FIG. 11(m). This causes both of the two inputs to the AND gate AG1 to become high thus to make the output thereof high at this point of time. Accordingly, the flip-flop FF2 is reset and the Q output of it is inverted to become low. The counter CNT1 is then released from its cleared state and begins to count input pulses.

Further, when the flip-flop FF1 is set by the high pulse from the inverter IV2, the Q output of the flip-flop FF1 becomes low as shown in FIG. 11(k). Since this causes the transistor Tr1 to be kept in a conductive state, the circuit system continues its operation because power supply thereto is not cut off even if the trigger button 34 is released from its state of being depressed at this point of time.

When the counter CNT1 begins to count input pulses under this condition and when the B output of it becomes high as shown in FIG. 11(p), the analog switch ASW is turned on thereby and the output of the amplifier circuit 65 shown in FIG. 5 is supplied to the recording head 15B to cause it to perform magnetic recording of signals for one frame of the picture image of an object on the outermost track of the disc 11. The B output of the counter CNT1 arranged in this embodiment is obtained by frequency dividing by two the pulses Pf of timing corresponding to the vertical synchronization signal (FIG. 10(a)) from the synchronization control circuit 45 as has already been described with reference to FIG. 10. The high level period of time of the B output of the counter CNT1 is two periods of the pulses Pf, i.e. 1/30 sec. Meanwhile, in the circuit system shown in FIG. 5, the output of the image sensor is read out, and accordingly the field signal is produced, continuously twice in a repeated manner within this length of time 1/30 sec. Therefore, a signal of 2 fields=1 frame is magnetically recorded on the track of the disc 11. As already mentioned, therefore, the motor control circuit MCC is arranged to control the rotating speed of the motor Mo in such a way as to have the disc 11 rotated at the rate of 1,800 r.p.m.

When 1/30 second has elapsed after the B output of the counter CNT1 became high as shown in FIG. 11(p), the B output again becomes low to turn off the analog switch ASW. During this period, a signal for one frame is magnetically recorded on the track of the disc 11 in the 2 fields—1 frame manner. Since the detection head 15A is disposed ahead of the recording head 15A as mentioned in the foregoing, when recording of 1 frame has been completed, the magnetic signal recorded by the recording head 15B is picked up by the detection head 15A. Accordingly, in the output up by the detection head 15A, there appears an AC signal component, i.e. a video signal component, and this causes the output level of the integration circuit HIC to become higher than a predetermined level. This in turn makes the output of the Schmidt circuit SMC high as shown in FIG. 11(g). Then, the flip-flop FF3 is reset thereby and the Q output of the flip-flop FF3 becomes low as shown in FIG. 11(m). Accordingly, the reset input R of the flip-flop FF2 becomes low and the flip-flop FF2 is set by the high level output of the Schmidt circuit SMC. The Q output of the flip-flop FF2 then becomes high as shown in FIG. 11(l). The counter CNT1 is cleared by this and becomes incapable of counting. The B output of the counter CNT1 thus becomes as shown in FIG. 11(p) and is low after completion of recording. Accordingly, the analog switch ASW is turned off. With the output of the Schmidt circuit SMC having become high, the B output of the counter CNT2 is applied to the base of the transistor Tr3 through the AND gates AG3 as shown in FIG. 11(s). The transistor Tr3 is rendered conductive thereby to energize the plunger Pl. Accordingly, the head carrying member 25 is moved forward by the feed claw 27 as much as one tooth of the ratchet teeth 25b. The heads 15A and 15B are shifted by this to a second track. Since the second track has not been recorded in this case, the AC signal component disappears from the output of the detection head 15A as the shifting of the heads 15A and 15B is effected to the second track. After a predetermined period of time, therefore, the output level of the integration circuit becomes lower than the predetermined level and, accordingly, the output of the Schmidt circuit SMC then becomes low as shown in FIG. 11(g).

When the output of the Schmidt circuit SMC becomes high, the flip-flop FF1 is reset and the Q output of it becomes low as shown in FIG. 11(j). Since the flip-flop FF1 will not be set thereafter as long as a high pulse is not produced from the inverter IV2, the flip-flop FF3 is not set thereafter. Accordingly, the operation of the camera CA is stopped or suspended in a state of having completed the shifting of the heads 15A and 15B to the next non-recorded track. Under this condition, if the depression of the trigger button 34 is eased back to its first stroke to open only the second step trigger switch SWR2 and if, after that, the trigger button 34 is again depressed to the second step stroke to turn on the second step trigger switch SWR2, the differentiation circuit DFC again comes to produce negative pulses. Then, the flip-flop FF1 is again set by the high pulse coming from the inverter IV2 to allow recording on the non-recorded track. Upon completion of recording on this non-recorded track, the heads 15A and 15B are shifted further to another non-recorded track and the camera is again stopped or suspended in this condition.

When the operation of the camera CA is stopped or suspended by the resetting of the flip-flop FF1, the Q output of the flip-flop FF1 has been high. Therefore, at this point of time, the transistor Tr1 is released from its state being kept conductive. If the trigger button 34 has been released from the state of being depressed and if the trigger switches SWR1 and SWR2 thus have been turned of at this point of time, the transistor Tr1 becomes non-conductive to cut off power supply to the whole circuits system. The timing for releasing the trigger button 34 from depression is arranged as follows: As indicated by Ⓐ in FIG. 11(a), if the switch SWR2 has once been turned on by depression of the button 34 to the second step stroke, the transistor Tr1 is caused to be retained in a state of being conductive by the action of the flip-flop FF1 as mentioned in the foregoing. The camera, therefore, automatically performs the operation described in the foregoing and the heads 15A and 15B come to a stop upon completion of shifting to the second recording track. On the other hand, as indicated by Ⓑ also in FIG. 11(a), if the trigger button 34 is depressed only to the first step stroke and then released without going to the second step stroke, the conductivity holding arrangement is not applied to the transistor Tr1. Therefore, the camera is instantaneously stopped when the trigger button is released from the depression made in this manner.

Further, while the Q output of the flip-flop FF2 is low, i.e. during recording, the lamp La2 is caused to light up with the transistor Tr2 rendered conductive to indicate that recording is in process. It is advantageous to have this lamp La2 positioned to permit observation of it within the view finder.

In this mode S-A, upon completion of recording for one frame, the heads 15A and 15B are either stopped or suspended in a state having been automatically shifted to the next recording track. After that, the operation described in the foregoing is repeated to record picture image signals for one frame on each of recording tracks one after another every time the trigger button 34 is depressed to the second step stroke.

Then, the number of recording tracks that have been recorded in this manner is indicated on the track number indicating graduation plate 75 by the pointer 73 which is attached to the fore end of the counting member 72 which is shown in FIG. 9. Upon completion of recording on the innermost track of the disc 11, when the heads 15A and 15B are automatically shifted, the protrusion 76 provided on the form end of the counting member 72 comes to open the end switch SWE and power supply to the whole circuit system is cut off.

The foregoing description has covered a recording operation on a recording disc 11 which has not been recorded at all. In cases where the camera is loaded with a cartridge containing a disc that has some of its recording tracks already recorded, the camera operates in the following manner: Assuming that the first track of the disc 11 has already been recorded, the flip-flop circuits FF1, FF3 and FF4 are reset and the flip-flop circuit FF2 is set by the pulse produced from the power up clear circuit PUC when the first step trigger switch SWR1 is turned on. The output level of the integration circuit HIC becomes higher than a predetermined level when the motor starts. Therefore, as shown in FIG. 12(m), the output of the Schmidt circuit SMC becomes high. Accordingly, as will be understood from FIG. 7B, the Q outputs of the flip-flop circuit FF1 and FF3 remain low as shown in FIGS. 12(e) and (h), because at least their reset inputs R remain high. Therefore, the flip-flop FF2 is not reset and the Q output of the flip-flop FF2 remains high as shown in FIG. 12(g). Thus, there obtains a condition of inhibiting recording. Further, since the output of the inverter IV1 becomes low when the output of the Schmidt circuit SMC is high, the flip-flop FF4 is not set and its Q output remains low as shown in FIG. 12(i). Therefore, even if the second step trigger switch SWR2 is turned on by further depression of the trigger button 34 at this point of time, the transistor Tr4 is not rendered conductive thereby. Therefore, the differentiation circuit DFC does not produce a negative pulse. On the other hand, when the output of the Schmidt circuit SMC becomes high, the B output of the counter CNT2 is applied to the base of the transistor Tr3 through the AND gate AG3 as shown in FIG. 12(o). Accordingly, when the transistor Tr3 is rendered conductive, the plunger Pl is energized to shift the heads 15A and 15B to the next track. If the next track has not been recorded before, the output level of the integration circuit HIC becomes lower than the predetermined level. Accordingly, as shown in FIG. 12(m), the output of the Schmidt circuit SMC becomes low after a predetermined period of time to make the output of the inverter IV1 high. By this, the flip-flop FF4 is set and the Q output of it becomes high as shown in FIG. 12(i). Therefore, if at this point of time the second step trigger switch has been turned on, the transistor Tr4 becomes conductive to cause the differentiation circuit DFC to produce a negative pulse as shown in FIG. 12(c). Then, the high pulse from the inverter IV2 (FIG. 12(d) (comes to set the flip-flop FF1 and the Q output of the flip-flop FF1 becomes high as shown in FIG. 12(e). The flip-flop FF3 is set by this and the Q output thereof becomes high as shown in FIG. 12(h). Accordingly, when the output of the delay circuit DLC becomes high (FIG. 12(j)), the flip-flop FF2 is reset and its Q output becomes low as shown in FIG. 12(g). Then, as mentioned in the foregoing, signals for one frame are recorded on the new recording track. If this new track has already been recorded, the output of the Schmidt circuit SMC remains high as shown by a broken line in FIG. 12(m). Therefore, with the recording inhibiting condition being kept unchanged as shown by broken lines in FIG. 12(c)-(i), (l) and (o), the heads 15A and 15B are further shifted to the next track. After that, when the output of the Schmidt circuit SMC becomes low as shown by a broken line in FIG. 12(m), i.e. when these heads arrive at a non-recorded track, the above mentioned actions are performed, as shown by broken lines in FIGS. 12(c)-(i) and (l), to have signals for one frame recorded on this non-recorded track.

In cases where a cartridge having some of tis tracks already recorded is used, therefore, double recording on the recorded tracks is inhibited and the heads 15A and 15B are arranged to be automatically shifted without performing recording on the recorded tracks until a non-recorded track is detected. Upon completion of recording on the non-recorded track, the heads are shifted to a next non-recorded track. After completion of shifting, the camera CA is either stopped or suspended.

The operation in the mode S-A has been described in the foregoing, operation in the next mode S-M, i.e. single picture image shot—manual head shifting mode, will be understood from the following description: When the slide 37 is shifted to the position M, the switch SWM1 is shifted thereby from the side of the plunger Pl to the side of the lamp La3 while the push switch SWP is connected to the plunger Pl through the switch SWM2. Therefore, even when a track which is facing the heads 15A and 15B are not automatically shifted to a next track. Instead of that, the lamp La3 flickers in response to the output of the AND gate AG3, or the B output of the counter CNT2, to give a warning that the track facing these heads 15A and 15B has already been recorded. See FIG. 12(p). In this case, the push button 38 is depressed to turn on the switch SWP for shifting the heads 15A and 15B to a next track.

In this mode S-M, if the track facing the heads 15A and 15B has not been recorded, recording can be performed by operating the trigger button in the same manner as described in the foregoing. Upon completion of recording on this track, however, the heads 15A and 15B are not shifted to a next track while the lamp La3 just flickers even when the output of the Schmidt circuit SMC becomes high—see broken lines in FIGS. 11(g) and (s) and FIG. 11(t). The heads 15A and 15B are shifted, in this case, by turning on the push switch SWP. On the other hand, if the track facing the heads 15A and 15B has already been recorded, the lamp La3 flickers as shown in FIG. 12(p). The heads 15A and 15B, therefore, can be shifted to a next track by turning on the switch SWP. Then, if this track has not been recorded, recording can be performed thereon. If this track has been recorded, the lamp La3 continues to flicker to give a further warning. In this manner, the warning by the lamp La3 is repeated until the heads 15A and 15B arrive at a non-recorded track; and, with the push button 38 thus being repeatedly depressed, recording is performed on a non-recorded track when the heads 15A and 15B come to the non-recorded track.

The details of the functions of the above stated flip-flop FF4 and the transistor Tr4 are as follows: If the flip-flop FF4 and the transistor Tr4 are not provided in the circuit system shown in FIG. 7, in cases where the trigger button 34 is rapidly depressed to the second step stroke to almost concurrently turn on the trigger switches SWR1 and SWR2 when a recording track facing the heads 15A and 15B is detected already recorded in the above stated mode S-A and some subsequent tracks are also found recorded, or when, in the mode S-M, a track facing the heads 15A and 15B is detected already recorded, even if the turning on of the trigger switch SWR2 causes the differentiation circuit DFC to produce the negative pulse and thus to have a high pulse produced from the inverter IV2, the output of the Schmidt circuit SMC might have not become high. Then, as will be understood from FIG. 7B, the flip-flop FF1 would not be set at least the Q output thereof would remain low. In such a case, even if the heads 15A and 15B are brought to a non-recorded track by automatic shifting in the mode S-A or by operating the push button 38 in the mode S-M, the output of the Schmidt circuit SMC is low at this point of time while the flip-flop FF1 is still not set and its Q output also remains low. Therefore, the camera CA is either stopped or suspended in a state of having the heads 15A and 15B brought to the non-recorded track, so that recording cannot be performed on the non-recorded track. On the other hand, with the flip-flop FF4 and the transistor Tr4 provided, the flip-flop FF4 is set only when the output of the inverter IV1 is high, i.e. when the output of the Schmidt circuit SMC is low indicating that a track facing the heads 15A and 15B has not been recorded. Therefore, as will be understood from FIGS. 12(a), (c), (i) and (m), the transistor Tr4 does not become conductive as long as the output of the Schmidt circuit is high, that is as long as the heads 15A and 15B are facing a recorded track, even if the switch SWR2 has been turned on. Therefore, the differentiation circuit DFC does not produce the negative pulse. Then, when the heads 15A and 15B come to face a non-recorded track and when the output of the Schmidt circuit thus become low, the flip-flop FF4 is set to make the transistor Tr4 conductive. Then, the differentiation circuit DFC comes to produce the negative pulse and the flip-flop FF1 is set thereby. With this arrangement, therefore, the above stated trouble of inoperativeness can be effectively avoided.

Operation in the mode of continuous picture image shots will be understood from the following description: For continuous picture image shots, the selection dial 36 is shifted to the mode C1 or C2. This causes each of the switches SW1-SW3 to shift to the terminal C1 or C2. Further, in this case, even if the slide 37 is in the mode position M, the cam 39 which is responsive to the mode selection dial 36 shifts the slide 37 to the mode position A. Accordingly, each of the switches SWM1 and SWM2 comes to be connected to the terminal A. Then, with the switch SW2 connected to the terminal C1 or C2, the differentiation circuit DFC is caused to short-circuit between its terminals a and b. Once the flip-flop FF4 is set, therefore, the output of the differentiation circuit DFC remains low as long as the second step trigger switch SWR2 is on. The set input S of the flip-flop FF1, therefore, is high as long as the switch SWR2 is on and, as will be understood from FIG. 7B, the Q output of the flip-flop FF1 is high as long as its reset input R is low. Further, the $\bar{Q}$ output of the flip-flop FF1 is low as long as its set input S is high. Therefore, while the trigger button 34 is being depressed to the second step stroke, picture image recording is not inhibited and recording shots are performed continuously as long as the heads 15A and 15B are facing a non-recorded track. Further, if a recorded track is detected during the recording operation, the output of the Schmidt circuit SMC becomes high upon detection of it. The flip-flop FF2 is set by this and the counter CNT1 is cleared (i.e. recording is inhibited). At the same time, the plunger is energized to carry out automatic shifting of the heads 15A and 15B to a next track. In this instance, when the output of the Schmidt circuit SMC becomes high, both the set input S and the reset input R of the flip-flop FF1 become high. Therefore, as will be understood from FIG. 7B, the Q output of the flip-flop FF1 becomes low while, on the other hand, the flip-flop FF3 is reset. This condition remains unchanged as long as the heads 15A and 15B are facing a recorded track. When the heads 15A and 15B arrive at a non-recorded track, the output of the Schmidt circuit SMC becomes low to make the Q output of the flip-flop FF1 high. Accordingly, the flip-flop FF3 is set and the Q output thereof becomes high. This in turn resets the flip-flop FF2 to remove the recording inhibition and to permit resumption of recording. This action is continuously performed as long as the trigger button 34 is in a state of being depressed to the second step stroke. Further, the holding of continuity of the transistor Tr1 is effected in the same manner as described in the foregoing. The switch SW3 selects the output of the AND gate AG5 in the mode C1 and selects that of the AND gate AG6 in the case of the mode C2. A continuous shot operation is performed at a rate of about 6 picture images/sec. in the case of the mode C1 and about 3.3 picture images/sec. in the mode C2.

FIG. 13 shows the operation of the circuit system in the mode C1 or C2. In this drawing, the mode C1 is shown by full lines and the mode C2 by broken lines.

The camera CA is provided with an external output jack 42. With an ordinary VTR device connected to this jack and by setting the mode selection dial 36 set in the mode position MV, a motion picture shot operation in the 2 fields—1 frame manner can be carried out at a rate of 30 frames/sec. With the dial 36 set in the mode position MV, each of the switches SW1-SW3 is shifted to a terminal MV thereof. When the trigger button 34 is depressed at least to the first step stroke to just turn on the switch SWR1, the circuit 69 and the light measuring circuit PMC are actuated. A combined color video signal of NTSC system is then produced out of the jack 42 to be recorded on a magnetic tape in the VTR device.

Further, the actions of the camera CA described in the foregoing can be started by operating a remote controller connected to the remote control jack 43 instead of by operating the trigger button. In this case, since the circuit shown in FIG. 7 is provided with a safety circuit consisting of the flip-flop FF4 and the transistor Tr4 as mentioned in the foregoing, the remote controller is required to have just a single switch.

Referring now to FIG. 14, one example of modification of the above mentioned embodiment of the invention is described as shown below:

In this modification example, a single magnetic head is used for the combined purposes of detecting non-recorded or recorded track and performing a recording operation. The operation mode of the device is shiftable as desired by utilizing the output of the above stated counter CNT1 in the same manner as the control system shown in FIG. 7. FIG. 14 shows only the parts that are different from the arrangement shown in FIG. 7. Other parts that are omitted from the illustration are arranged in exactly the same manner as in FIG. 7. Description given here is, therefore, limited to the parts differing from the arrangement shown in FIG. 7.

In FIG. 14, a reference numeral 15' indicates a magnetic head which is employed for the combined puspposes of detecting and recording. The head 15' is connected to the above stated analog switch ASW and to an analog switch ASW' is connected to the DC cut capacitor C provided in the input stage of the above stated non-recorded or recorded track detection circuit (i.e. the amplifier AP, the integration circuit HIC and the Schmidt circuit SMC). The analog switch ASW' is arranged to receive from the inverter IV4 an inverted output of the signal to be supplied to the above stated analog switch ASW. In this arrangement, when the recording control signal (i.e. the B output of the counter CNT1 or the output of the AND gate AG5 or AG6) which is selected by the switch SW3 is low, the analog switch ASW' is turned on to use the head 15' for the purpose of detecting a non-recorded or recorded track. Then, if a non-recorded track is detected by this and the recording control signal from the switch SW3 becomes high to permit recording, the analog switch ASW is turned on to use the head 15' for the purpose of recording on the non-recorded track. Other details of operation are exactly the same as in the case of the circuit shown in FIG. 7 and are omitted from description here.

Figure 15:
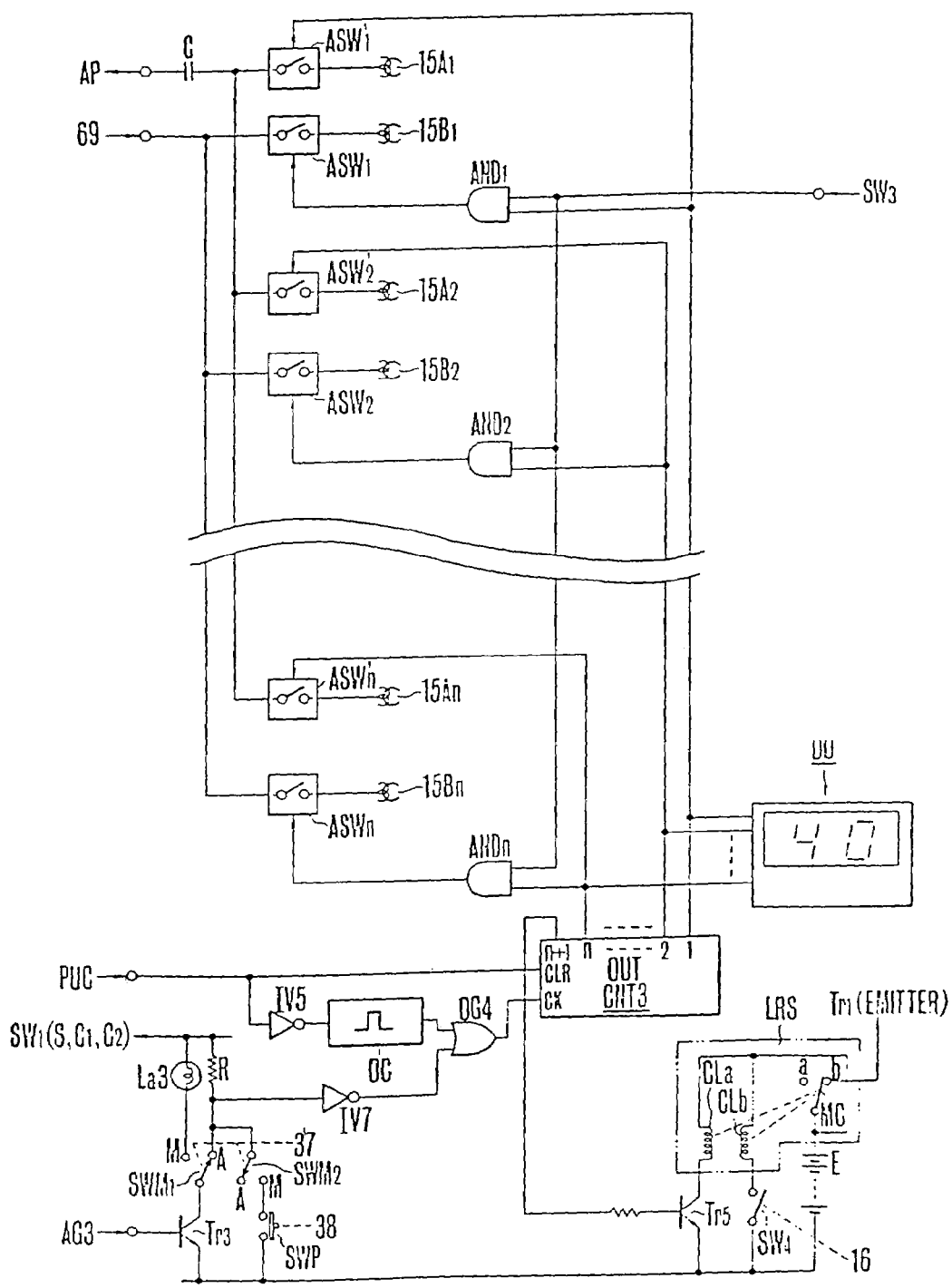
FIG. 15 is a circuit diagram showing the arrangement of an essential part in another modification example of the embodiment shown in FIG. 7.
Figure 16:
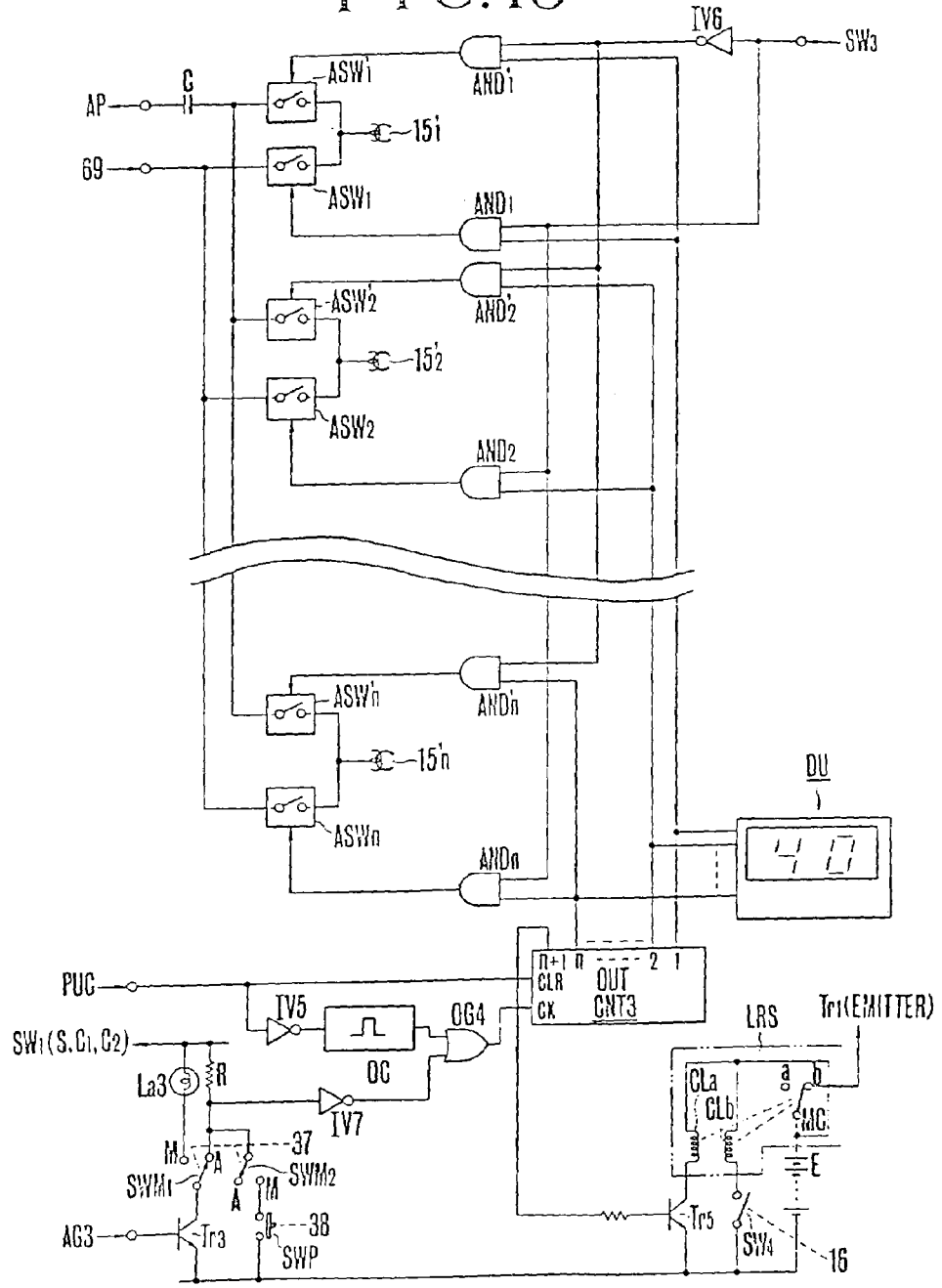
FIG. 16 is a circuit diagram showing the arrangement of an essential part in a further modification example of the embodiment shown in FIG. 7.

In the embodiments described in the foregoing, the head is arranged to be mechanically shifted relative to the tracks of the disc 11. In addition to these embodiments, other embodiments are shown in FIG. 15 and FIG. 16. In each of the embodiment, the magnetic head is arranged to be a multi-channel head having a number of channels corresponding to the number of tracks of the disc 11 and is fixedly disposed to perform the function of discerning a recorded or non-recorded track and the function of recording on a non-recorded track by shifting it from one channel to another. FIGS. 15 and 16 show only the essential parts required for carrying out the above stated functions and, unless specifically stated otherwise, other parts that are not shown in these drawings are exactly the same as the arrangement shown in FIG. 7.

Referring first to FIG. 15 which corresponds to FIG. 7, a reference symbol CNT3 indicates a binary counter of a pulse fall synchronization type incorporating a decoder, or a counter-decoder, which is provided for channel shifting. The clear terminal CLR of the counter CNT3 is arranged to receive the output of the power up clear circuit PUC. A symbol IV5 indicates an inverter arranged for obtaining an inverted signal of the output of the power up clear circuit PUC; OC indicates a one shot circuit which is arranged to be triggered by building up of the output of the inverter IV5; and OG4 indicates an OR gate which is provided for obtaining a logical sum of the output of the one shot circuit OC and the output of an inverter IV7 the input terminal of which is connected to a resistor R provided in place of the above stated plunger Pl. The output of the OR gate OG4 is arranged to be supplied to the clock input terminal CK of the counter CNT3 as count up clock. Reference numerals 15A1-15A$n$ indicate non-recorded- or recorded-track detecting heads which are fixedly arranged to correspond to the tracks provided on the disc 11; and 15B1-15B$n$ indicate recording heads which are also fixedly arranged to correspond to these tracks. These heads constitute a so-called multi-channel head. In the same manner as in the case of the head 15 shown in FIG. 8, the detection heads 15A1-15A$n$ are positioned ahead of the recording heads 15B1-15B$n$ in relation to the rotation of the disc 11. In this particular embodiment, the number of heads "n" means 40 and these heads are unified into one body. Symbols ASW'1-ASW'n indicate analog switches respectively connected to the heads 15A1-15A$n$ and are connected to the input stage of the above stated non-recorded- or recorded-track detection circuit, i.e. to a DC cut capacitor on the input side of the amplifier AP. Symbols ASW1-ASWn indicate analog switches connected to the heads 15B1-15B$n$ and also to the output stage of the image pickup—video signal generating—magnetic recording circuit 69. Symbols AND1-ANDn indicate AND gates which are arranged to obtain logical products of the recording control signal selected by the above stated switch SW3, i.e. the B output of the counter CNT1 or the output of AND gate AG5 or AG6 and the decoded outputs 1-n of the above stated counter CNT3. The outputs of these AND gates AND1-ANDn are supplied to the analog gates ASW1-ASWn. Further, the decoded outputs 1-n of the counter CNT3 are supplied to the analog switches ASW'1-ASW'n respectively.

The arrangement described above operates as follows: With the trigger button 34 depressed to the first step stroke, the power up clear circuit PUC produces pulses as shown in FIG. 11($g$). Then, this causes all of the decoded outputs 1-n of the counter CNT3 to become low. Following this, when the one shot circuit OC is triggered by building up of the output of the inverter IV5 and when the one shot pulse of the one shot circuit OC is produced, this causes the counter CNT3 counts up by one and first the decoded output 1 thereof becomes high. The analog switch ASW'1 is turned on and the output of the detection head 15A1 is applied to the amplifier AP through the capacitor C. Then, if the first track facing the heads 15A1 and 15B1 has not been recorded, the flip-flop FF1 is reset with flip-flop FF3 set as mentioned in the foregoing, and the recording head 15B1 performing recording on the first track. After recording, when the completion of the recording on this track is detected by the detection head 15A1, a high pulse output of the AND gate AG3 renders the transistor Tr3 momentarily conductive. Therefore, in cases where the switches SWM1 and SWM2 have been shifted to the mode A (i.e. in the case of the mode S-A, C1 or C2), this causes the inverter IV7 to produce a high pulse output. Then, building-up of this output pulse of the inverter IV7 causes the counter CNT3 to count up by one to make the decoded output 2 thereof high. Then, the analog switch ASW'2 is turned on this time. The detection head 15A2 detects whether the second track is not recorded. In the mode C1 or C2, if the second track is not recorded, the recording head 15B2 performs recording on the second track when the recording control signal from the switch SW3 becomes high in the same manner as described in the foregoing. Conversely, if the second track is found already recorded, a high pulse output of the AND gate AG3 renders the transistor Tr3 momentarily conductive. Then, building-up of the inverter IV7 causes the counter CNT3 to count up by one and the decoded output 3 of the counter becomes high. Accordingly, the above mentioned detection is performed on a third track. Thus, in the case of the mode C1 or C2, recording on non-recorded tracks is repeated as long as the trigger button 34 is kept in a state of being depressed in the same manner as in the preceding embodiment.

In the mode S-A, after completion of recording on a non-recorded track, the pulse-fall of the output pulse of the inverter IV7 causes the counter CNP3 to count up by one; under this condition, the camera is either stopped or suspended; after the trigger button 34 is released from depression, when it is depressed again, detection is performed by shifting from one to another the detection heads 15A1-15A$n$ starting with the head 15A1 until a non-recorded track is detected thereby; and, upon detection of a non-recorded track, recording is performed thereon by a recording head that corresponds to this track. Further, in the mode S-M, the channel shifting of the heads 15A1-15A$n$ and 15B1-15B$n$ is carried out by operating the push switch SWP in the same manner as in the embodiment shown in FIG. 7. In other words, the input to the inverter IV7 becomes low with the switch SWP turned on. Therefore, by the building-up of the output of the inverter IV7, the counter CNT3 is caused to count up by one to permit the channel shifting of the heads.

In the modification example which is shown in FIG. 16 and which corresponds to the embodiment shown in FIG. 12, a multi-channel head is composed of heads 15'1-15'$n$ each of which is arranged to serve combined purposes of detecting and recording, unlike the heads 15A1-15A$n$ and 15B1-15B$n$ which are used in the arrangement shown in FIG. 15. Each of these heads 15'1-15'$n$ is connected to analog switches ASW'1 and ASW1, ASW'2 and ASW2 . . . , or ASW'$n$ and ASW$n$. There are arranged AND gates AND'1-AND'n to obtain logical products of the recording control signal which is selected by the switch SW3 (i.e. the B output of the counter CNT1 or the output of AG5 or AG6) and is obtained as inverted signal through an inverter IV6 and the decoded outputs 1-n of the counter CNT3. The outputs of these AND gates AND'1-AND'n are arranged to be supplied to the analog switches ASW'1-ASW'n as applicable respectively.

The device arranged as shown in FIG. 16 operates in a manner which will be readily understood from the foregoing description of the arrangement shown in FIGS. 14 and 15. Therefore, the operation of the device is omitted here.

According to the arrangements shown in FIGS. 15 and 16, the mechanical arrangement for shifting the head as shown in FIG. 2 is no longer required. With these arrangements employed, it will be disadvantageous to have the "A"-to-"M" change-over arrangement including the slide 37, push button 38 and the switches SWM1, SW2 and SWP. In these modification examples, the above stated lamp La3 may be connected to the collector of the transistor Tr3 to display the count up action of the counter CNT3, i.e. the channel shifting status of the heads 15A1-15A$n$ and 15B1-15B$n$. As for displaying the number of recorded tracks in the modification examples shown in FIGS. 15 and 16, the display may be arranged, for example, in the following manner: The device is provided with a display unit DU consisting of a decoder drive and a display seven segment LED. The outputs 1—n of the counter CNT3 are supplied to the decoder disposed within the display unit DU to make digital display. It is also possible to use a LED dot array display unit consisting of n number of light emitting diodes (LED). In such a case, it will be convenient to have the display made within the view finder.

In the modification example shown in FIG. 15 or 16, the end switch SWE and control for the switch SWE are arranged, for example, as follows: A so-called latching relay switch LRS is employed as shown in the drawing as end switch SWE. The latching relay switch is arranged to have its movable contact piece shifted from a terminal b to a terminal a when its coil CLa is energized. The connection to the terminal a is retained, for example by a holding force of a permanent magnet even when power supply to the coil CLa is cut off. Then, when the power is supplied again to the coil, the movable contact piece MC shifts from the terminal a to the terminal b and again is kept in contact with the terminal b by the holding force of the permanent magnet. One end of the coil CLa is connected to the collector of a NPN switching transistor Tr5 which is arranged to receive the decoded output n+1 of the above stated counter CNT3 and the one end of the coil CLb is connected to one off the contact pieces of a normally open type switch SW4 which is arranged to be turned on, for example, by opening the lid 16 of the cartridge loading chamber. The movable contact piece MC and the other end of each of the coils CLa and CLb are connected to the plus side of the power source E while the terminal b is connected to the emitter of the transistor Tr1. The emitter of the transistor Tr5 and the other contact piece of the switch SW4 are connected to the minus side of the power source E. With arrangement made in this manner, when the loading chamber lid 16 is opened for loading the camera CA with a cartridge 12, the switch SW4 is turned on to energize the coil CLb. The movable contact piece MC then connects with the terminal b. Then, with the first step trigger switch SWR1 turned on by depression of the trigger button, the transistor Tr1 is made conductive to allow power supply to the circuit system. After completion of recording on all tracks of the disc 11, when the decoded output n+1 of the counter CNT3 becomes high, the transistor Tr5 is made conductive thereby and the coil CLa is energized to shift the movable contact piece MC from the terminal b to the terminal a. Therefore, power supply to the circuit system is cut off at this point of this even if the first step trigger switch SWR1 is on. When the loading chamber lid 16 is opened to take out the recorded cartridge, the switch SW4 is turned on to energize the coil CLb. Again the movable contact piece MC is shifted from the terminal a to the terminal b and is kept there until the coil CLa is energized through the transistor Tr5.

As described in the foregoing, in accordance with this invention, a relatively simple logical arrangement not only permits single picture image recording but also permits continuous recording on a plurality of tracks. It must be emphasized that the invention makes it possible to carry out analytical photographic recording for moving objects, so that unique, interesting picture images can be enjoyed by reproducing such records. The functional improvement attained in accordance with this invention makes the recording device usable for a wide range of purposes.

Further, as also shown in the embodiment examples given herein, the continuous recording can be performed at different selectable speeds. This arrangement gives a further advantageous effect. Further, with the invented device used in combination with an ordinary VTR device, it is possible to accomplish recording of a moving object at a VTR speed without being confined to recording on a recording medium having a limited number of recording tracks.

In accordance with the arrangement made in the embodiment examples, a state of having been already recorded or not recorded of the track on which recording is going to be performed can be accurately detected. This is a highly advantageous feature for a device of this type which must meet the rational requirements mentioned in the beginning of this specification. With a very simple logical arrangement, the device of the invention is capable of performing advantageous functions, such as inhibiting double recording, giving a warning against it, automatic shifting of recording means to a non-recorded track and the like.

The arrangement to display the number of recorded tracks as shown in the embodiment examples is very simple. The display arrangement, therefore, can be easily incorporated in the device, is less likely to come out of order and can be added at low cost, so that it gives a great advantage to the picture image recording device. Further, as also shown in the embodiment examples, the power source of the recording device is arranged to be automatically cut off upon completion of recording on all recording tracks. This is highly rational arrangement for a device of this type.

In the embodiment examples given, the image pickup—video signal generation—magnetic recording system circuitry to be used in accordance with this invention is arranged to use a CCD image sensor as image pickup element. However, it goes without saying that, in place of the CCD image sensor, conventionally known image pickup tubes, such as a vidicon, etc. are also usable as image pickup element. Further, a magnetic disc is used as recording medium in the embodiment examples. However, the invention is not limited to this. Use of other recording media, such as a magnetic drum is also usable with minor modification of the structural arrangement of the device.

The invention claimed is:

1. A camera apparatus, comprising:
   (A) a single release switch member for instructing an image capture operation, wherein said single release switch member selects one of a first operative state and a second operative state, the first operative state is selected when said single release switch member is pushed down to a first depth, and the second operative state is selected when said single release switch member is pushed down to a second depth which is deeper than the first depth;
   (B) a recording circuitry which records an image signal on a recording medium;
   (C) an automatic selecting circuitry which automatically selects a recordable portion of the recording medium in response to selection of the first operative state, wherein said automatic selecting circuitry is arranged for generating a predetermined electrical signal if said automatic selecting circuitry selects the recordable portion of the recording medium; and
   (D) a control circuitry which controls said recording circuitry so as to record the image signal on the recordable portion selected by said automatic selecting circuitry if the second operative state is selected by said single release switch member and the predetermined electrical signal is generated by said automatic selecting circuitry.

2. A camera apparatus according to claim 1, wherein the recording medium is disc-shaped.

3. A camera apparatus according to claim 1, further comprising:
   (E) a first detection circuitry which detects the selection of the first operative state when said single release switch member is pushed down to the first depth; and
   (F) a second detection circuitry which detects selection of the second operative state when said single release switch member is pushed down to the second depth.

4. A camera apparatus according to claim 1, further comprising a driving unit which rotates the recording medium.

5. A camera apparatus according to claim 1, wherein the recording medium is a removable recording medium.

6. A camera apparatus, comprising:
   (A) a single release member for instructing an image capture operation, wherein said single release switch member selects one of a first operative state and a second operative state, the first operative state is selected when said single release switch member is pushed down to a first depth, and the second operative state is selected when said single release switch member is pushed down to a second depth which is deeper than the first depth;
   (B) a recording circuitry which records an image signal on a recording medium;
   (C) an automatic selecting circuitry which automatically selects a recordable portion of the recording medium in response to selection of the first operative state, wherein said automatic selecting circuitry is arranged for generating a predetermined electrical signal if said automatic selecting circuitry selects the recordable portion of the recording medium; and
   (D) a control circuitry which controls said recording circuitry so as not to record the image signal on the recordable portion selected by said automatic selecting circuitry until the second operative state is selected by said single release switch member and the predetermined electrical signal is generated by said automatic selecting circuitry.

7. A camera apparatus according to claim 6 wherein the recording medium is disc-shaped.

8. A camera apparatus according to claim 6, further comprising:
   (E) a first detection circuitry which detects the selection of the first operative state when said single release switch member is pushed down to the first depth; and
   (F) a second detection circuitry which detects selection of the second operative state when said single release switch member is pushed down to the second depth.

9. A camera apparatus according to claim 6, further comprising a driving unit which rotates the recording medium.

10. A camera apparatus according to claim 6, wherein the recording medium is a removable recording medium.

* * * * *